US012116841B2

(12) United States Patent
Smith

(10) Patent No.: US 12,116,841 B2
(45) Date of Patent: *Oct. 15, 2024

(54) OPERATING SYSTEM FOR A COVERING FOR AN ARCHITECTURAL OPENING

(71) Applicant: Hunter Douglas Inc., Pearl River, NY (US)

(72) Inventor: Stephen P. Smith, Denver, CO (US)

(73) Assignee: Hunter Douglas Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,294

(22) Filed: Feb. 23, 2023

(65) Prior Publication Data

US 2023/0203884 A1 Jun. 29, 2023

Related U.S. Application Data

(63) Continuation of application No. 16/987,471, filed on Aug. 7, 2020, now Pat. No. 11,643,872, which is a (Continued)

(51) Int. Cl.
*E06B 9/72* (2006.01)
*E06B 9/26* (2006.01)

(Continued)

(52) U.S. Cl.
CPC .................. *E06B 9/72* (2013.01); *E06B 9/26* (2013.01); *E06B 9/322* (2013.01); *E06B 9/34* (2013.01);

(Continued)

(58) Field of Classification Search
CPC ... E06B 9/26; E06B 9/322; E06B 9/34; E06B 9/50; E06B 9/62; E06B 2009/2435; E06B 9/72; E06B 9/74
See application file for complete search history.

(56) References Cited

U.S. PATENT DOCUMENTS 1,118,033 A 11/1914 McCloud
1,325,105 A 12/1919 Minnis (Continued)

FOREIGN PATENT DOCUMENTS

JP 58-69695 U 5/1983
TW M430224 U1 6/2012

OTHER PUBLICATIONS

PCT International Search Report and Written Opinion for International application No. PCT/US2013/030176 dated May 10, 2013.

(Continued)

*Primary Examiner* — Abe Massad
(74) *Attorney, Agent, or Firm* — KDW Firm PLLC

(57) ABSTRACT

A covering for an architectural opening is provided. The covering may include a roller rotatable about a longitudinal axis, a shade associated with the roller, and an operating system operably associated with the roller. The operating system may include a base, a drive mechanism, a transmission, an actuator arm, and an engagement arm. The drive mechanism may be associated with the base to provide an input torque. The transmission may be associated with the drive mechanism to selectively transmit the input torque to the roller. The actuator arm may be associated with the base to indirectly set a rotation direction of the roller. The engagement arm may be associated with the base and engageable with the transmission.

16 Claims, 30 Drawing Sheets

Related U.S. Application Data continuation of application No. 15/856,121, filed on Dec. 28, 2017, now Pat. No. 10,774,586, which is a continuation of application No. 14/766,043, filed as application No. PCT/US2013/030176 on Mar. 11, 2013, now Pat. No. 9,890,588.

(51) Int. Cl.

| | |
|---|---|
| ***E06B 9/322*** | (2006.01) |
| ***E06B 9/34*** | (2006.01) |
| ***E06B 9/50*** | (2006.01) |
| ***E06B 9/62*** | (2006.01) |
| ***E06B 9/74*** | (2006.01) |
| *E06B 9/24* | (2006.01) |

(52) U.S. Cl.

CPC .................. *E06B 9/50* (2013.01); *E06B 9/62* (2013.01); *E06B 9/74* (2013.01); *E06B 2009/2435* (2013.01)

(56) References Cited

U.S. PATENT DOCUMENTS

| | | | | |
|---|---|---|---|---|
| 1,568,203 | A | 1/1926 | Bernard | |
| 6,129,131 | A | 10/2000 | Colson | |
| 6,201,364 | B1 | 3/2001 | Will et al. | |
| 6,223,802 | B1 | 5/2001 | Colson | |
| 7,128,126 | B2 | 10/2006 | Smith et al. | |
| 7,159,635 | B2 | 1/2007 | Holt et al. | |
| 7,228,797 | B1 | 6/2007 | Hillman et al. | |
| 7,578,334 | B2 | 8/2009 | Smith et al. | |
| 8,186,413 | B2 | 5/2012 | Fujita et al. | |
| 8,851,143 | B2 | 10/2014 | Zhu | |
| 9,187,951 | B2 * | 11/2015 | Yu | E06B 9/90 |
| 9,890,588 | B2 | 2/2018 | Smith | |
| 10,451,145 | B2 | 10/2019 | Chen et al. | |
| 11,136,821 | B2 | 10/2021 | Smith et al. | |
| 11,486,198 | B2 | 11/2022 | Anthony et al. | |
| 11,643,872 | B2 * | 5/2023 | Smith | E06B 9/50 160/311 |
| 2004/0226663 | A1 | 11/2004 | Smith et al. | |
| 2006/0118248 | A1 | 6/2006 | Anderson et al. | |
| 2006/0272783 | A1 | 12/2006 | Smith et al. | |
| 2008/0202709 | A1 | 8/2008 | Anderson et al. | |
| 2009/0120593 | A1 | 5/2009 | Lesperance | |
| 2010/0018656 | A1 * | 1/2010 | Fujita | E06B 9/32 160/319 |
| 2013/0025805 | A1 | 1/2013 | Lin | |
| 2013/0220561 | A1 | 8/2013 | Yu et al. | |
| 2014/0216668 | A1 * | 8/2014 | Kim | E06B 9/42 160/322 |
| 2015/0007946 | A1 | 1/2015 | Yu et al. | |
| 2015/0368968 | A1 | 12/2015 | Smith | |

OTHER PUBLICATIONS

IPRP of International application No. PCT/US2013/030176 dated Mar. 25, 2015.

Third Party Submission under 37 CFR 1.290 filed on Dec. 12, 2019.

* cited by examiner

OPERATING SYSTEM FOR A COVERING FOR AN ARCHITECTURAL OPENING

CROSS-REFERENCE TO RELATED APPLICATIONS

This application is a continuation application of U.S. patent application Ser. No. 16/987,471, filed Aug. 7, 2020, entitled "Operating System For a Covering For an Architectural Opening", which is a continuation application of U.S. patent application Ser. No. 15/856,121, filed Dec. 28, 2017, now U.S. Pat. No. 10,774,586, entitled "Operating System For a Covering For an Architectural Opening", which is a continuation application of U.S. patent application Ser. No. 14/766,043, filed Aug. 5, 2015, now U.S. Pat. No. 9,890,588, entitled "Operating System For a Covering For an Architectural Opening", which application is the national stage application of International Patent Application No. PCT/US2013/030176, filed Mar. 11, 2013, entitled "Operating System For a Covering For an Architectural Opening', which are hereby incorporated by reference herein in their entirety for all purposes.

FIELD OF THE DISCLOSURE

The present disclosure relates generally to coverings for architectural openings, and more particularly to methods and apparatus for operating a covering for an architectural opening.

BACKGROUND

Coverings for architectural openings, such as windows, doors, archways, and the like, have taken numerous forms for many years. Some conventional coverings include a retractable shade portion that is movable between an extended position and a retracted position. In the extended position, the shade portion of the covering may be positioned across the opening. In the retracted position, the shade portion of the covering may be positioned adjacent one or more sides of the opening.

To move the shade portion of the covering between the extended and retracted positions, some coverings include a roller rotatably associated with a fixed end rail of the covering. Rotation of the roller in a first direction retracts the shade portion of the covering to a position adjacent one or more sides of the opening, and rotation of the roller in a second, opposite direction extends the shade portion across the opening. The roller generally extends between two opposing end caps, and the shade portion of the covering may wrap around the roller or be gathered or stacked adjacent to the roller. For example, some retractable coverings include a flexible shade or shade material suspended from a roller. The shade material can either be wrapped about the roller to retract the shade material or unwrapped from the roller to extend the shade material. As another example, some retractable coverings, such as Venetian blinds, include a plurality of slats that are raised or lowered as lift cords are wrapped about or unwrapped from a rotatable roller. Regardless of the form of the retractable covering, rotation of the roller generally causes movement of the shade portion of the covering. To actuate movement of the roller, and thus the shade portion of the covering, an operating system may be operably coupled to the roller.

SUMMARY

Examples of the disclosure may include a covering for an architectural opening. In one example, the covering may include a roller, a shade, and an operating system. The roller may be rotatable about a longitudinal axis in an extension direction and a retraction direction. The shade may be associated with the roller. The operating system may be operably associated with the roller. The operating system may include a base, a drive mechanism associated with the base to provide an input torque, a transmission associated with the drive mechanism to selectively transmit the input torque to the roller, and an actuator arm operably associated with the base to indirectly set a rotation direction of the roller. The actuator arm may be movable about a first axis that is generally transverse to the longitudinal axis of the roller.

The covering may further include an engagement arm operably associated with the base and movable about a second axis. The second axis may be generally parallel to the longitudinal axis of the roller. The second axis may be generally transverse to the first axis. The engagement arm may selectively engage the transmission to set the rotation direction of the roller. The transmission may include a ring gear, and the engagement arm may selectively engage the ring gear to set the rotation direction of the roller. The operating system may further include a biasing element configured to bias the engagement arm into engagement with the transmission. To set the rotation direction of the roller to the extension direction, the actuator arm may contact the engagement arm to disengage the engagement arm from the transmission. The engagement arm may include a detent configured to retain the actuator arm in a position associated with the extension direction. The drive mechanism may include a single operating element. The single operating element may be operably associated with the actuator arm so that select movement of the single operating element moves the actuator arm. The shade may be wrappable about the roller. The drive mechanism may be motorized. When the actuator arm indirectly sets the rotation direction of the roller to the extension direction, the shade may extend automatically under the influence of gravity without further action by an operator.

In another example, the covering may include a rotatable roller, a shade associated with the roller, and an operating system operably associated with the roller. The operating system may include a base, a drive mechanism associated with the base to provide an input torque, a transmission associated with the drive mechanism to selectively transmit the input torque to the roller, an engagement arm movably associated with the base and selectively engageable with the transmission to set a rotation direction of the roller, and an actuator arm operably associated with the base and the engagement arm to move the engagement arm relative to the transmission. The actuator arm may be movable about a first axis, and the engagement arm may be movable about a second axis that is generally transverse to the first axis.

The roller may be rotatable about a longitudinal axis. The first axis may be generally transverse to the longitudinal axis of the roller. The second axis may be generally parallel to the longitudinal axis of the roller. The actuator arm may be positioned relative to the transmission so that the actuator arm does not engage the transmission. When the engagement arm sets the rotation direction of the roller to an extension direction, the shade may extend automatically under the influence of gravity without further action by an operator.

In another example, an operating system for an architectural covering is provided. The operating system may include a base, a drive mechanism operably associated with the base to provide an input torque, a transmission operably associated with the drive mechanism to selectively transmit the input torque, an engagement arm movably associated with the base and engageable with the transmission, and an actuator arm operably associated with the base and the engagement arm to move the engagement arm relative to the transmission. The actuator arm may be movable about a first axis. The engagement arm may be movable about a second axis that is generally transverse to the first axis. The actuator arm may be positioned relative to the transmission so that the actuator arm does not engage the transmission.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary. Moreover, reference made herein to "the present invention" or aspects thereof should be understood to mean certain examples of the present disclosure and should not necessarily be construed as limiting all examples to a particular description.

BRIEF DESCRIPTION OF THE DRAWINGS

The accompanying drawings, which are incorporated in and constitute a part of the specification, illustrate examples of the disclosure and, together with the general description given above and the detailed description given below, serve to explain the principles of these examples.

FIGS. 1A through 1F are isometric views of a mechanically-operated covering with a shade portion in various positions, while

Figure 1A:
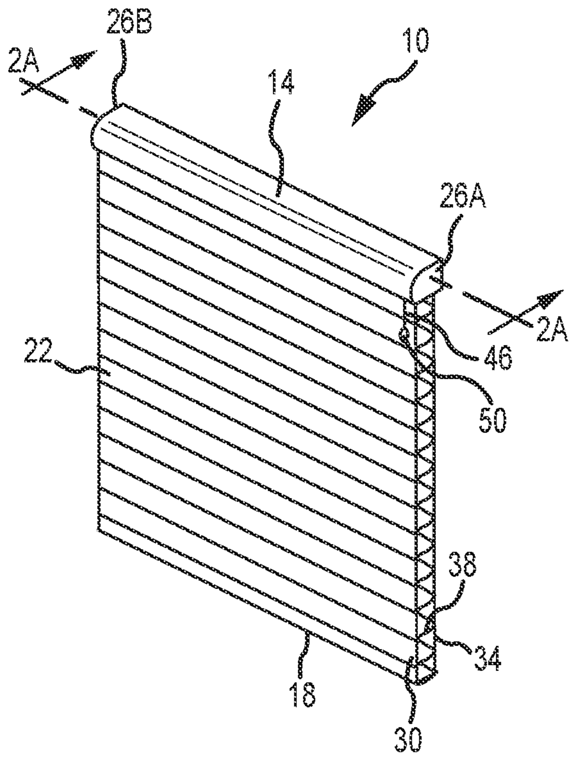

It should be understood that the drawings are not necessarily to scale. In certain instances, details that are not necessary for an understanding of the disclosure or that render other details difficult to perceive may have been omitted. In the appended drawings, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label. It should be understood that the claimed subject matter is not necessarily limited to the particular examples or arrangements illustrated herein.

DETAILED DESCRIPTION

The present disclosure provides an operating system for a covering for an architectural opening. The operating system may be a fully contained module mounted on an end of a head rail of the covering and may support an end of an associated roller. The operating system may include a retraction mode and an extension mode. When in the retraction mode, the operating system is operable to raise or retract a shade portion of the covering. When in the extension mode, the operating system is operable to lower or extend the shade portion of the covering.

The operating system may utilize a single operating element, such as a cord or ball chain, to switch the operating system between the retraction and extension modes and, once in the retraction mode, to retract or lift the shade portion of the covering. To switch between modes, an operator may move the operating element in preset directions. In one implementation, a downward motion shifts the operating system into the retraction mode, while a lateral motion shifts the operating system into the extension mode.

Once in the retraction mode, in one implementation a single retractable operating element may be manipulated by an operator with a motion of vertical, reciprocating strokes to retract or lift the shade portion of the covering. A brake element or mechanism may inhibit or prevent the shade portion of the covering from extending or lowering across the architectural opening during retraction. To shift the operating system into the extension mode, an operator may move the operating element in a transverse direction relative to an extension/retraction direction of the shade portion.

Once in the extension mode, the shade portion may extend without further action by the operator. In one implementation, once the operating system is shifted into the extension mode, the shade portion of the covering may lower automatically under the influence of gravity. The operating system may include a speed governing device to control or regulate the extension or lowering speed of the shade portion of the covering.

Referring to FIGS. 1A through 1F, a retractable covering 10 for an architectural opening is provided. The retractable covering 10 includes a head rail 14, a bottom rail 18, and a shade portion, for example a flexible shade 22, extending between the head rail 14 and the bottom rail 18. The head rail 14 includes two opposing end caps 26A, 26B, which may enclose the ends of the head rail 14 to provide a finished appearance. The bottom rail 18 may extend horizontally along a lower edge of the shade material 22 and may function as a ballast to maintain the shade 22 in a taut condition and to aid in a gravity-assisted extension of the shade 22.

The shade 22 may include vertically suspended front 30 and rear 34 sheets of flexible material, such as sheer fabric, and a plurality of horizontally-extending, vertically-spaced flexible vanes 38. The vanes 38 may be secured along horizontal lines of attachment along front and rear edges to the front and rear sheets 30, 34. The sheets 30, 34 and vanes 38 may form a plurality of elongated, vertically-aligned, laterally-extending, transversely-collapsible cellular units which are longitudinally secured, such as adhered, to adjacent cellular units to define a vertical stack of cellular units, which may be referred to as a cellular panel. The sheets 30, 34 and/or the vanes 38 may be constructed of continuous lengths of material or may be constructed of strips of material attached or joined together in an edge-to-edge, overlapping, or other suitable relationship.

The shade 22 may be constructed of substantially any type of material. For example, the shade 22 may be constructed from natural and/or synthetic materials, including fabrics, polymers, and/or other suitable materials. Fabric materials may include woven, non-woven, knits, or other suitable fabric types. The shade 22 may have any suitable level of light transmissivity. For example, the shade 22, including the sheets 30, 34 and/or the vanes 38, may be constructed of transparent, translucent, and/or opaque materials to provide a desired ambience or decor in an associated room. In one example, the sheets 30, 34 are transparent and/or translucent, and the vanes 38 are translucent and/or opaque.

Figure 2A:
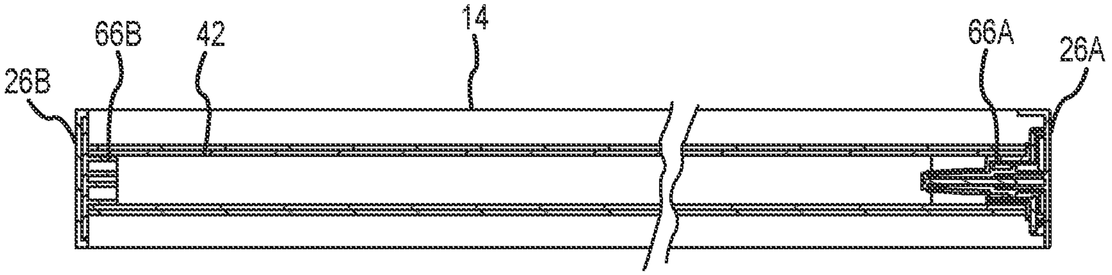
FIGS. 2A and 2B are section views taken along line 2A-2A as shown in FIG. 1A and line 2B-2B as shown in FIG. 1D of one example of a roller with a shade material unwrapped from and wrapped about the roller, respectively.
Figure 2B:
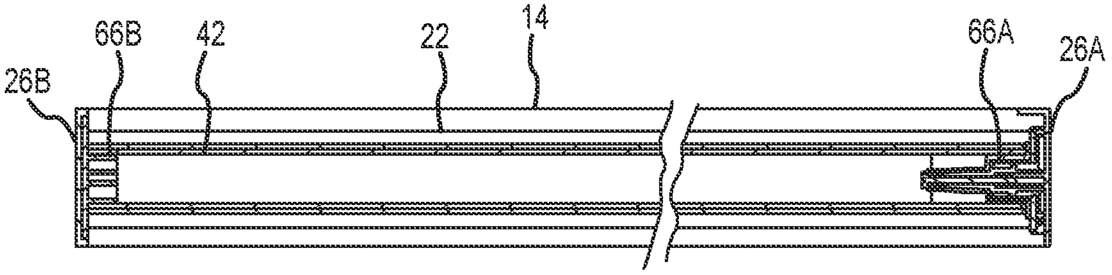

The shade 22 may be operably associated with a roller 42 so that rotational movement of the roller 42 about a longitudinally-extending axis moves the shade 22 between extended and retracted positions. For example, rotation of the roller 42 in a first direction may retract the shade 22 to a position adjacent one or more sides of an associated architectural opening and rotation of the roller 42 in a second, opposite direction may extend the shade 22 across the opening. The shade 22 may be coupled to and wrappable about the roller 42, as shown in FIGS. 2A and 2B, so that rotation of the roller 42 causes the shade 22 to wrap around or unwrap from the roller 42 depending upon the direction of rotation, generally referred to as a roller shade. Alternatively, the shade 22 may be stackable or gatherable adjacent to or beneath the roller 42. For example, the covering 10 may include lift elements, such as lift cords, wrappable about the roller 42 and extending between the head rail 14 and the bottom rail 18. As the roller 42 is rotated, the lift elements are wrapped about or unwrapped from the roller 42 to effect extension or retraction of the shade 22.

Still referring to FIGS. 1A through 1F, the covering 10 is shown with the shade 22 in various positions. FIG. 1A depicts the shade 22 in a fully extended position in which rotation of the roller 42 moves the front and rear sheets 30, 34 vertically (relative to each other) to shift the vane 38 material between open and closed positions. In the open or expanded position, the front and rear sheets 30, 34 are horizontally spaced with the vanes 38 extending substantially horizontally therebetween. FIGS. 1B through 1F depict the shade 22 in partially extended or retracted positions in which the shade 22 is in the closed position. When in the closed or collapsed position, the front and rear sheets 30, 34 are relatively close together and the vanes 38 extend generally vertically in an approximately coplanar, contiguous relationship with the front and rear sheets 30, 34.

With continued reference to FIGS. 1A through 1F, the covering 10 includes an operating system that may allow an operator of the covering 10 to lift or lower the bottom rail 18 between fully retracted and fully extended positions. The operating system may include a drive mechanism configured to provide an input torque to the operating system. The drive mechanism may include a crank, an electrical motor, a spring, an operating element 46 operably coupled to a pulley, or any other suitable drive element or mechanism. The operating element 46 may be a cord, ball chain, or other suitable device. The operating element 46 may have a tassel 50 coupled to a free end of the operating element 46.

Figure 1B:
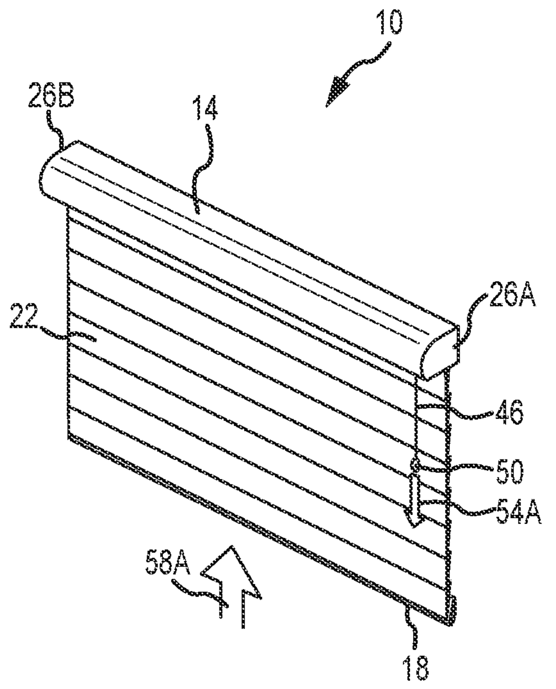

The operating system may be operated mechanically and/or electrically. For illustrative purposes, the example covering 10 shown in FIGS. 1A through 1F is operated mechanically with an operating element 46. As shown in FIG. 1G, the covering 10 may be operated electrically with a motor 43, a transceiver 44 operably coupled to the motor 43, and a transmitter, such as a remote-control unit 45, operably coupled to the transceiver 44.

To retract or lift the shade 22 from the fully extended position illustrated in FIG. 1A, an operator may pull downward on the operating element 46 with approximately vertical, reciprocating or repeating strokes. As shown in FIG. 1B, upon downward movement of the operating element 46 (represented by the arrow 54A), the shade material 22 is retracted, raised, or lifted (represented by the arrow 58A) from the fully extended position of FIG. 1A. Upon reaching the bottom of the downward stroke of the operating element 46, an operator may release or resistively raise the operating element 46 and the operating system automatically retracts or reels in the operating element 46 (represented by the arrow 54B) for repeated actuation.

Figure 1C:
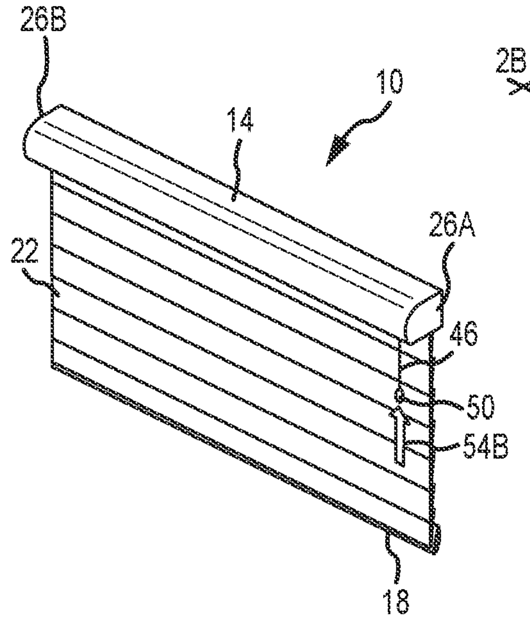
Figure 1D:
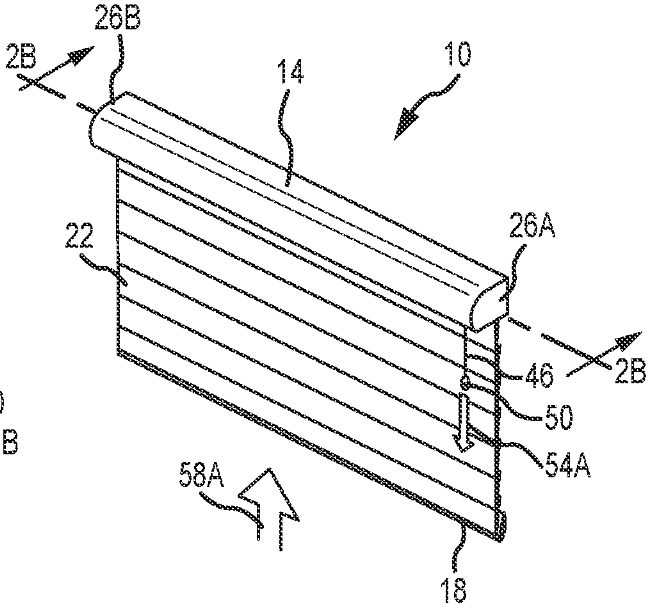

As shown in FIG. 1C, as the operating element 46 is retracted, the operating system maintains or holds the shade 22 in its new raised state. Once the operating system has retracted the operating element 46 a distance above the bottom of the stroke, an operator may pull downward on the operating element 46 in a second stroke to further retract the shade 22, as depicted in FIG. 1D. This reciprocating process is repeated until the shade 22 is retracted to a desired position. The vertical stroke of the operating element 46 may vary in different implementations of the operating system. In one implementation, the operating element 46 is about 48 inches in length. The ratio of the retraction of the shade 22 to the stroke of the operating element 46 also may vary depending on the specific implementation of the operating system. In one implementation, the ratio of shade 22 retraction to operating element 46 extension is approximately 0.4.

Figure 1E:
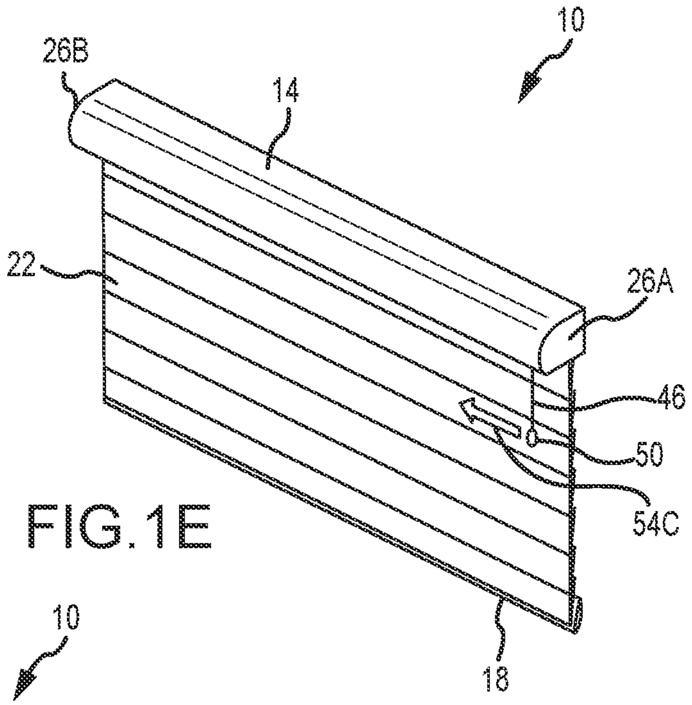
Figure 1F:
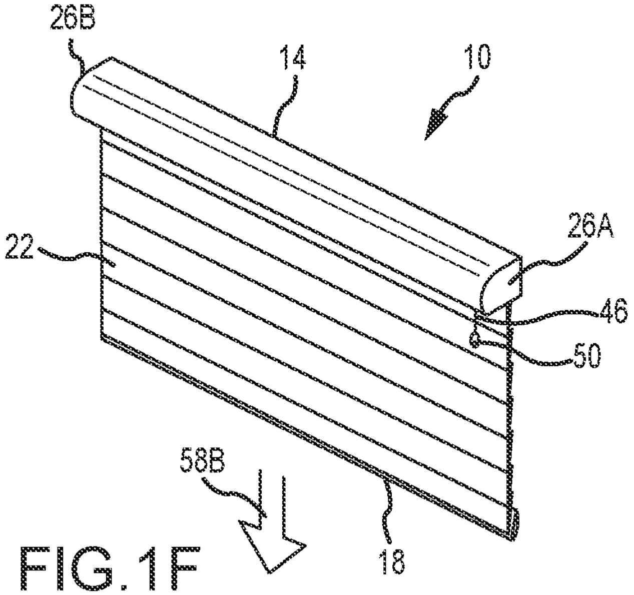
Figure 1G:
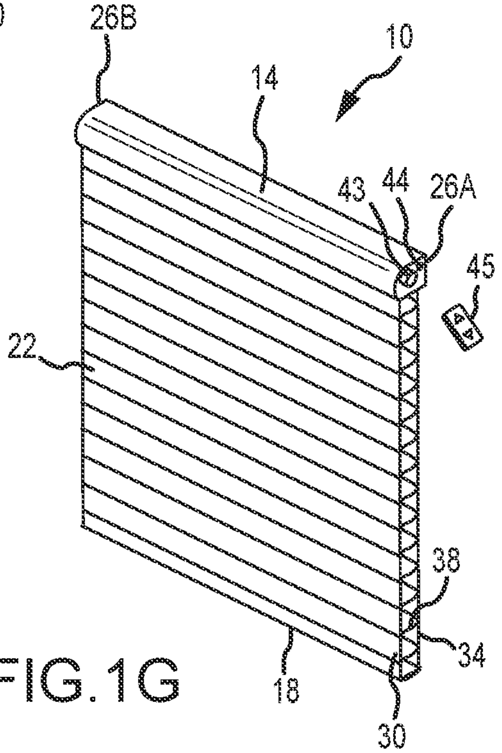
FIG. 1G is an isometric view of a motorized covering.

To extend or lower the shade 22 from a fully or partially retracted or lifted position, an operator may pull the operating element 46 in a diagonal or lateral direction across the face of the shade 22, as indicated by arrow 54C in FIG. 1E. The diagonal or lateral movement of the operating element 46 may shift the operating system into an extending mode in which the shade 22 may extend or lower automatically via gravity. Thus, in one implementation, after transitioning the operating system into the extending mode, the operator can release the operating element 46 and walk away from the covering 10 while the shade 22 extends or lowers without operator intervention, as indicated by arrow 58B in FIG. 1F. After the shade 22 is extended to a desired position, the operator can inhibit further extension, as well as retract or raise the shade 22, if desired, by pulling the operating element 46 vertically downward to shift the operating system into the retraction mode. In this retraction mode, the shade 22 may retract in response to the reciprocating process as described above and shown in FIGS. 1A through 1D. Additionally, the operating system may include a brake element or mechanism to prevent undesired extension or lowering of the shade 22 when the operating system is in the retraction mode.

With reference to FIGS. 2A and 2B, a roller 42 is shown in lengthwise cross section. FIG. 2A is a section taken along line 2A-2A of FIG. 1A and illustrates the roller 42 when the shade 22 is in an extended position. FIG. 2B is a section taken along line 2B-2B of FIG. 1D and illustrates the roller 42 with a portion of the shade material 22 wrapped about the roller 42, which may be concealed within the head rail 14. The roller 42 may be formed in various shapes, including an approximately cylindrical tube as shown in FIGS. 2A and 2B.

The roller 42 depicted in FIGS. 2A and 2B extends between two opposing end caps 26A, 26B and is rotatably coupled to the head rail 14 to retract or extend the shade 22 dependent upon the direction of rotation of the roller 42. In one implementation, the shade 22 is wrapped about or unwrapped from a rear side of the roller 42, with the rear side of the roller 42 positioned intermediate the front side of the roller 42 and a street side of an associated architectural opening. To actuate movement of the roller 42, and thus the shade 22 of the covering 10, the operating system may be operably associated with an end 66A, 66B of the roller 42 and serve as one of the end caps 26A, 26B.

Figure 3A:
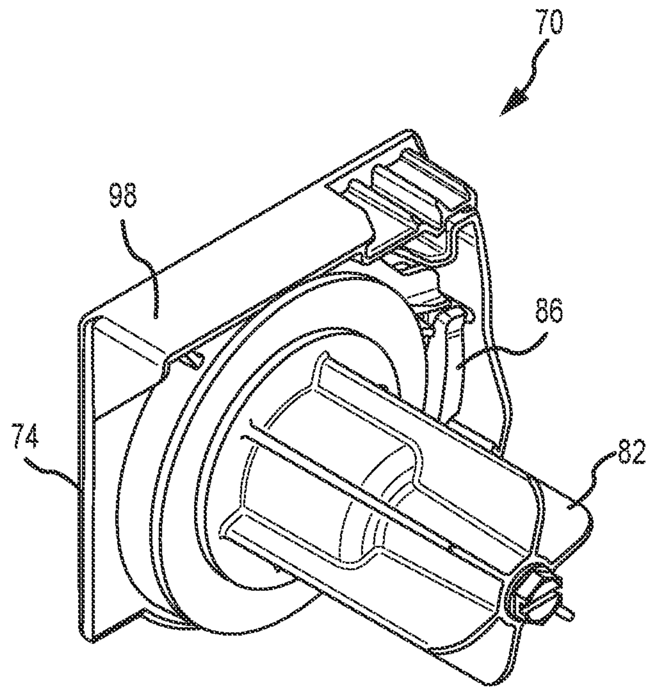
FIGS. 3A, 3B, and 3C are a distal isometric view, a distal elevation view, and a side elevation view, respectively, of one example of an operating system.
Figure 3B:
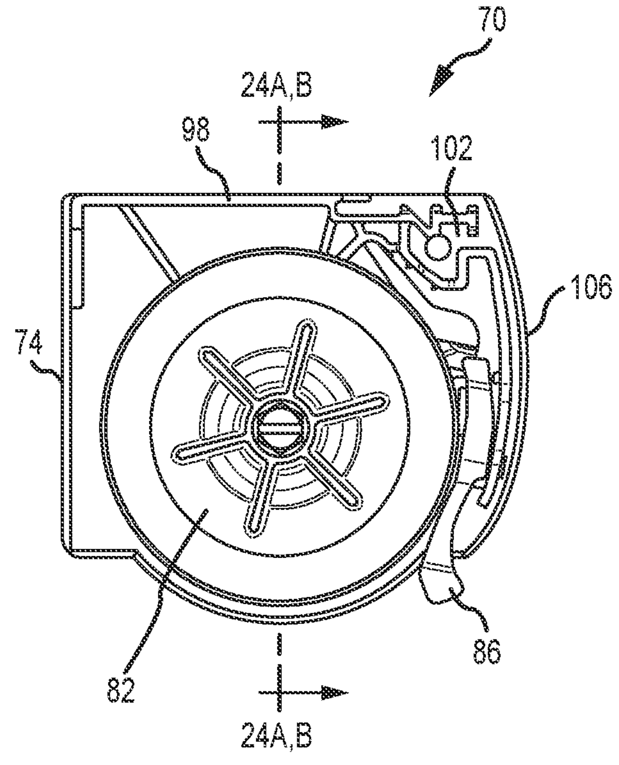
Figure 3C:
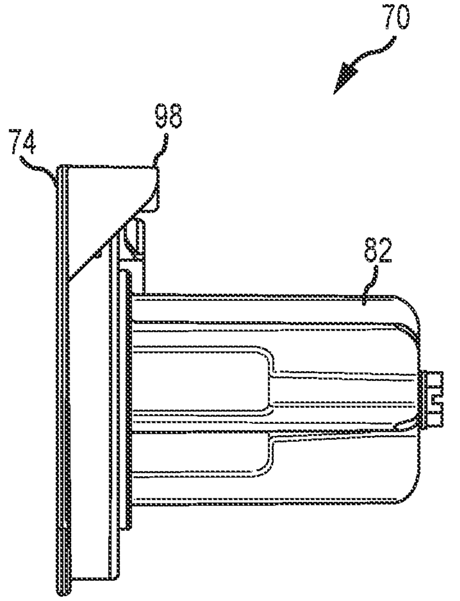

Referring to FIGS. 3A through 3C, one example of an operating system 70 is provided. The operating system 70 may be assembled as a single, modular unit that couples to one end of the head rail 14 and supports an associated end 66A of the roller 42. The operating system 70 may be pre-assembled and thus simplify on-site assembly of the covering 10. The operating system 70 may be referred to as an operating module or unit.

Figure 4A:
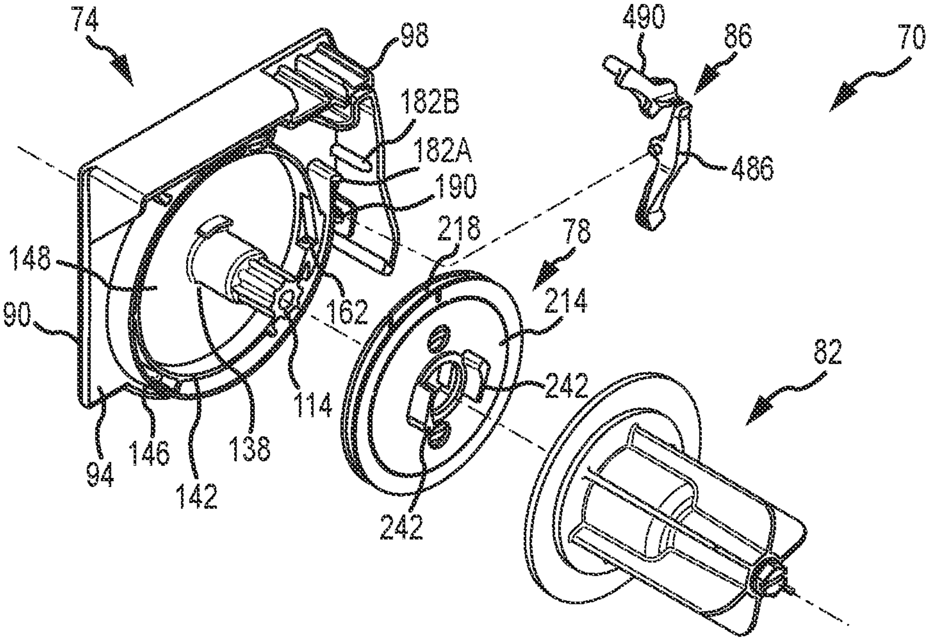
FIGS. 4A and 4B are an exploded, distal isometric view and an exploded, proximal isometric view, respectively, of the operating system shown in FIGS. 3A through 3C.
Figure 4B:
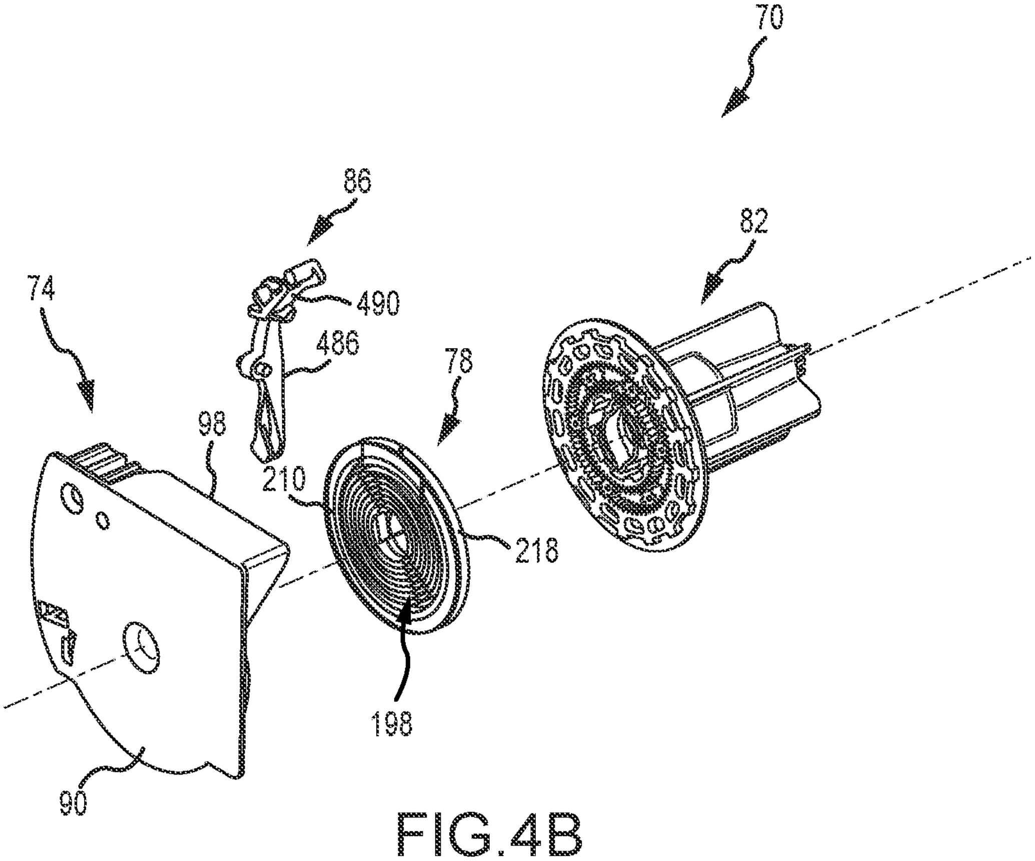

Referring to FIGS. 4A and 4B, the operating system 70 is shown in an exploded, sub-assembly view. The operating system 70 may include a base 74, a drive mechanism 78, a transmission 82, and an actuator or shift mechanism 86. The base 74, the drive mechanism 78, and the transmission 82 may be aligned along a common axis, which may be co-axial with a central axis of the roller 42. The actuator mechanism 86 may be laterally offset from the common axis and may be coupled to the base 74 near the periphery of the transmission 82. The actuator mechanism 86 may shift the operating system 70 between retraction and extension modes. In one implementation, the actuator mechanism 86 selectively interacts with the transmission 82 to transition the operating system between modes.

Referring to FIGS. 3A through 5C, the operating system 70 may include a base 74 configured to serve as an end cap 26A of the head rail 14 and to provide a foundation for the remaining components of the operating system 70. The base 74 may have a proximal face 90 and a distal face 94. The proximal face 90 may be exposed when attached to the head rail 14, and the distal face 94 may confront the drive mechanism 78, the transmission 82, and the actuator mechanism 86.

To attach the base 74 to the head rail 14, the base 74 may include a distally-extending, peripheral flange 98. The flange 98 may define a female receptacle 102 (see FIG. 5A) configured to snugly receive a corresponding male feature of the head rail 14. When looking at the distal face 94 of the base 74 (see FIG. 5A), the flange 98 may be inset from the right or front edge 106 of the base 74 to provide lateral space for the end of the head rail 14 to occupy in abutting relationship to an outer, front surface 110 of the flange 98. The inset distance may be designed to form a flush or seamless transition between the edge 106 of the base 74 and an outer, front surface of the head rail 14.

Figure 5A:
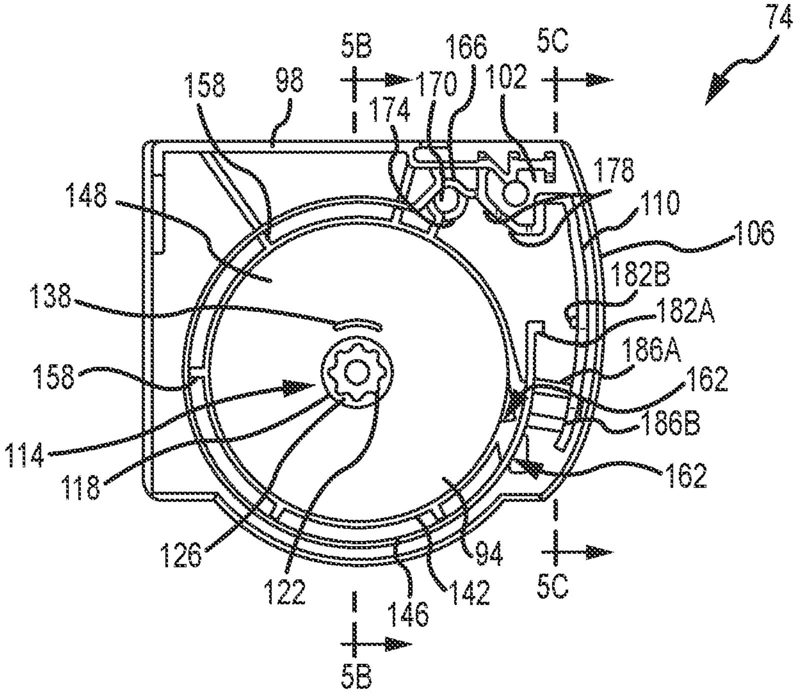
FIGS. 5A, 5B, and 5C are a distal elevation view, a section view taken along line 5B-5B as shown in FIG. 5A, and a section view taken along line 5C-5C as shown in FIG. 5A, respectively, of the base shown in FIGS. 4A and 4B.
Figure 5B:
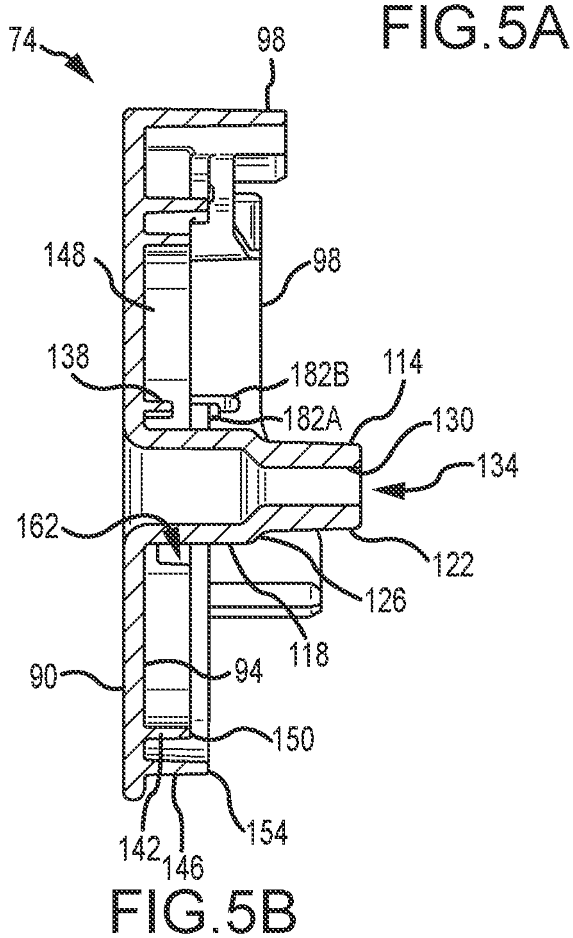

To attach the base 74 to the drive mechanism 78 and the transmission 82, the base 74 may include a post 114 extending distally from the distal face 94 of the base 74, as shown in FIGS. 4A, 5A, and 5B. The post 114 may include a proximal, smooth portion 118 and a distal, splined portion 122. That is, the smooth portion 118 may be located intermediate the distal face 94 and the splined portion 122. The splined portion 122 may have a smaller outer diameter than the smooth portion 118, thus defining a transitionary shoulder 126 located between the smooth and splined portions 118, 122 of the post 114. The post 114 may be hollow and may have an internal wall 130 that defines an axially-extending bore 134. The portion of the wall 130 corresponding to the splined portion 122 may be threaded.

With continued reference to FIGS. 4A, 5A, and 5B, the base 74 also may include a spool spring anchor 138 extending distally from the distal face 94 of the base 74 and positioned radially outward from the post 114. The anchor 138 may form a substantially circular arc, although other configurations are contemplated. If arc-shaped, the anchor 138 may extend any suitable angle around the central axis of the post 114. For example, the arc-shaped anchor 138 depicted in FIG. 5A extends about 45 degrees around a central axis of the post 114, although other angles more or less than 45 degrees are contemplated.

As shown in FIGS. 4A, 5A, and 5B, the base 74 further may include an inner annular rim 142 and an outer annular rim 146, both of which may extend distally from the distal face 94 of the base 74. The inner annular rim 142 is located radially outward of the post 114 and the anchor 138. The inner annular rim 142 may form a substantially continuous ring around the post 114 to define a space 148 located radially between the inner annular rim 142 and the post 114. The space 148 may be configured to receive the drive mechanism 78. When the drive mechanism 78 is seated within the space 148, a distal face of the drive mechanism 78 may be substantially flush or congruent with a distal face 150 of the inner annular rim 142.

Still referring to FIGS. 4A, 5A, and 5B, the outer annular rim 146 is spaced radially outward from the inner annular rim 142 and extends distally beyond a distal face 150 of the inner annular rim 142. That is, a distal face 154 of the outer annular rim 146 is located distally of the distal face 150 of the inner annular rim 142. Thus, the outer annular rim 146 defines an interior space located distally of and contiguous with the space defined by the inner annular rim 142. A portion of the outer annular rim 146 interior space extends radially outward of the inner annular rim 142 and receives a proximal portion of the transmission 82. The base 74 may include radially-extending spokes 158 that extend between the inner and outer annular rims 142, 146. The spokes 158 may be distally congruent with the distal face 150 of the inner annular rim 142.

With reference to FIGS. 4A and 5A, the base 74 further may define an operating element conduit 162 that extends through the inner and outer annular rims 142, 146. The conduit 162 may be configured to accommodate the passage of an operating element 46, such as a cord or ball chain. As such, the operating element 46 can be threaded through the conduit 162 so that a portion of the operating element 46 is positioned within the inner rim 142 and a portion of the operating element 46 is positioned outside of the outer rim 146, where the operating element 46 is accessible by an operator (see FIGS. 1A through 1F, for example).

Referring to FIGS. 4A, 5A, and 5B, the outer annular rim 146 may form a discontinuous ring around the inner annular rim 142 so that a portion of the inner annular rim 142 is not surrounded by the outer annular rim 146. A lock component of the actuator mechanism 86 may be operably coupled to the base 74 radially outward of, and adjacent to, the unsurrounded portion of the inner annular rim 142, which also may be described as the missing section or gap in the outer rim 146. In one implementation, the lock component of the actuator mechanism 86 is selectively positioned near the inner annular rim 142 to shift the operating system 70 into the retraction mode and away from the inner annular rim 142 to shift the operating system 70 into the extension mode.

Referring to FIG. 5A, adjacent to an upper end of the unsurrounded portion of the inner annular rim 142, the base 74 may include a boss 166 that extends distally from the distal face 94 of the base 74. The boss 166 may define a substantially cylindrical pivot aperture 170 configured to pivotably seat the lock component of the actuator mechanism 86. The boss 166 may include a recessed portion 174 to delimit a pivotable range of the lock component of the actuator mechanism 86. Adjacent to the boss 166 and radially outward from the missing section or gap of the outer rim 146, the base 74 may include placement tabs 178 that protrude from an inner wall of the flange 98 to define a seat for a biasing element, such as a spring.

With reference to FIGS. 4A and 5A, adjacent to the operating element conduit 162, the outer annular rim 146 may be positioned radially inward of the flange 98 in an overlapping relationship. The outer annular rim 146 and the flange 98 may each include an opposing guide rail 182A, 182B that extend toward each other to define a gap therebetween. A shifting component of the actuator mechanism 86 may be positioned between the opposing guide rails 182A, 182B.

Figure 19:
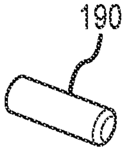
FIG. 19 is an isometric view of the cross pin shown in FIGS. 16A and 16B.

Below the guide rails 182A, 182B, the base 74 may include a pair of spaced protuberances 186A, 186B that extend laterally between the outer annular rim 146 and the flange 98. The protuberances 186A, 186B may protrude distally from the distal face 94 of the base 74, and each of the protuberances may include an arcuate or curved surface that oppose each other to define a seat for a cross pin 190 (see FIG. 19). Near the terminal ends of the protuberances 186A, 186B, the flange 98 and the outer annular rim 146 each may include a recession or opening, such as the aperture 192 formed in the flange 98, to house the ends of the cross pin 190.

Referring now to FIGS. 4A, 4B, and 6A through 8C, an example drive mechanism 78 of the operating system 70 is provided. The depicted drive mechanism 78 comprises a spool assembly having a spool 194 biased by a power or spool spring 198. Although as previously discussed, the operating system may be motorized.

Figure 8A:
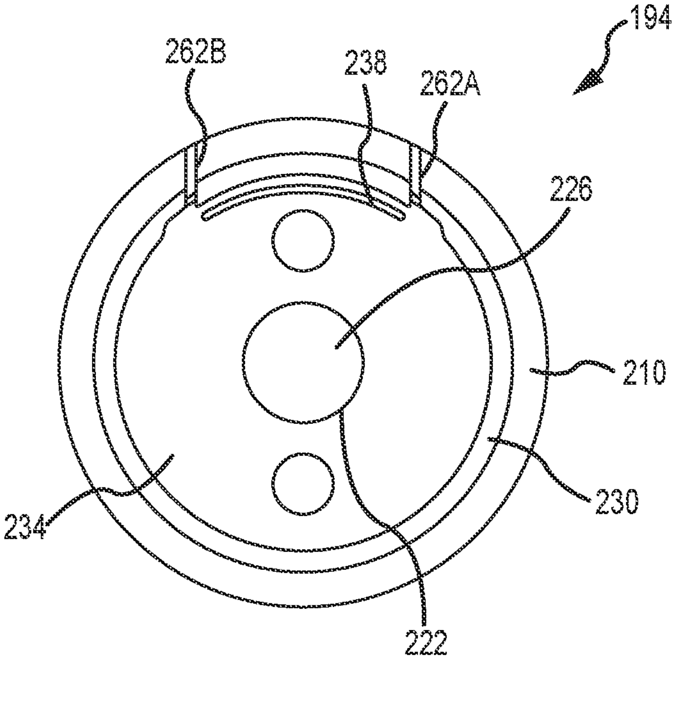
FIGS. 8A, 8B, and 8C are a proximal elevation view, a distal elevation view, and a side elevation view, respectively, of the spool shown in FIGS. 6A and 6B.
Figure 8B:
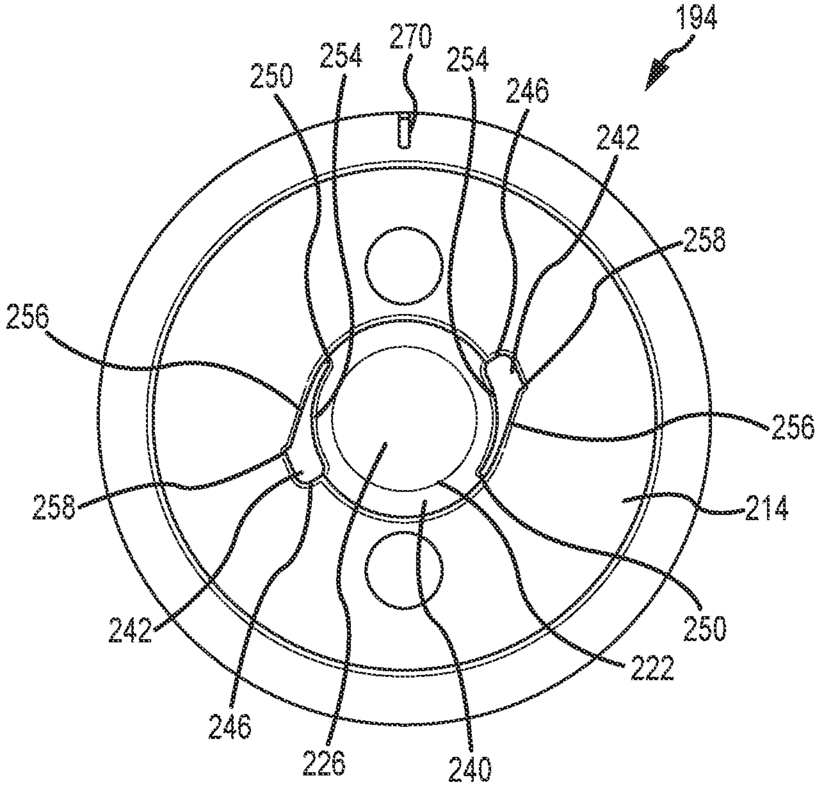
Figure 8C:
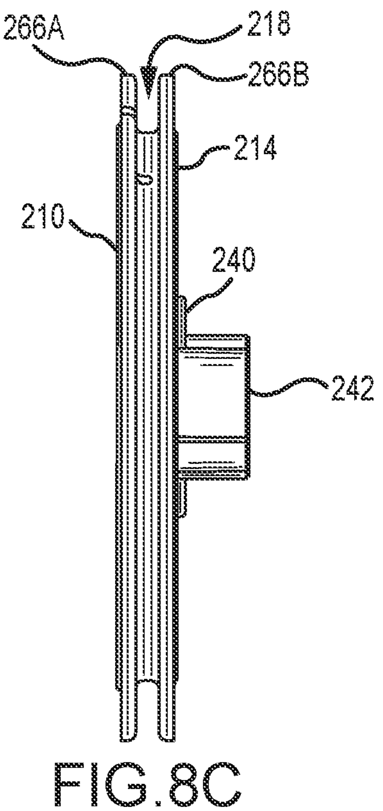

The spool 194, as shown in FIG. 8C, may include a proximal face 210, a distal face 214, and a circumferential groove 218 formed between the proximal and distal faces 210, 214. As shown in FIGS. 4A, 4B, 6A, 6B, 8A, and 8B, the spool 194 also may include a central aperture 226, defined by a substantially cylindrical wall 222, that is sized to receive the smooth portion 118 of the post 114 of the base 74. During operation, the wall 222 of the spool 194 may rotatably bear against the smooth portion 118 of the post 114.

Figure 6A:
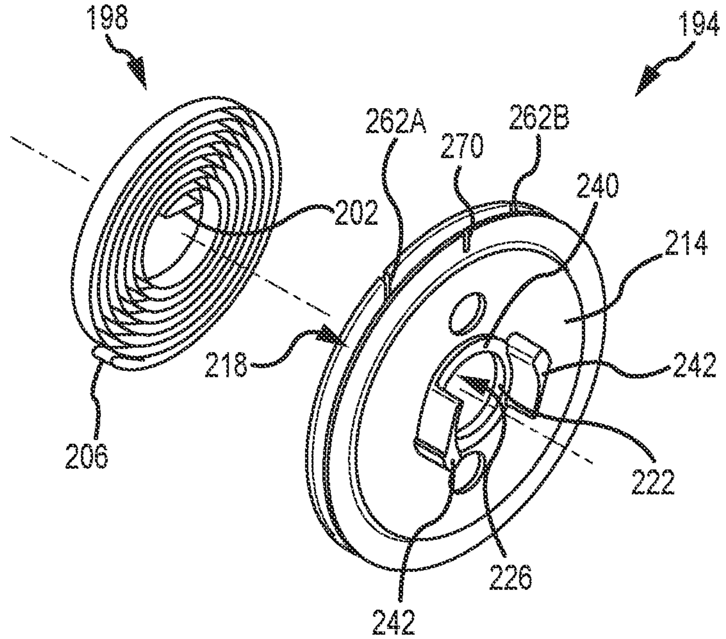
FIGS. 6A and 6B are an exploded, distal isometric view and an exploded, proximal isometric view, respectively, of the drive mechanism shown in FIGS. 4A and 4B.
Figure 6B:
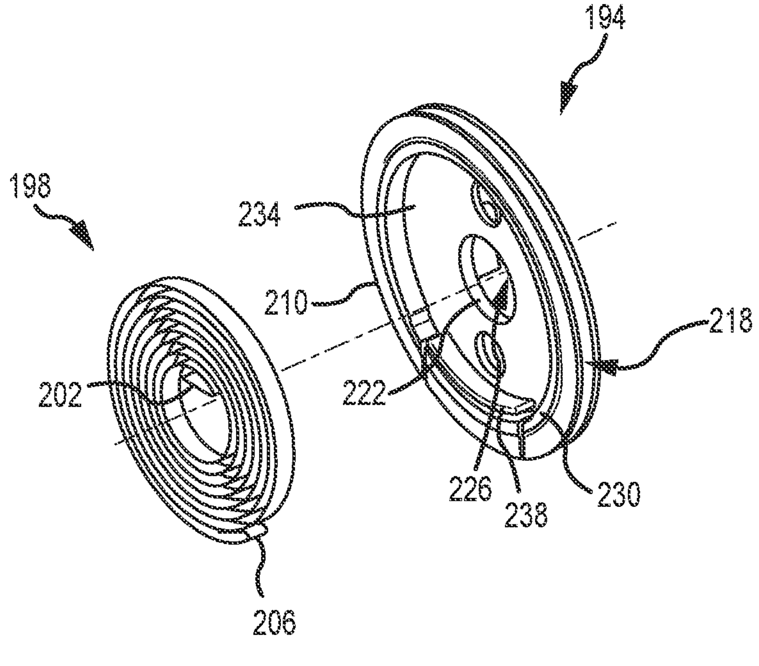

With reference to FIGS. 6B and 8A, the proximal face 210 of the spool 194 has a proximal abutment surface 230 positioned proximal and radially outward from an interior cavity 234. A spool spring anchor 238 may be located within the cavity 234. The anchor 238 may form a substantially circular arc, although other configurations are contemplated. The arc-shaped anchor 238 may extend any suitable angle around the central axis of the aperture 226. For example, the arc-shaped anchor 238 depicted in FIG. 5A extends about 60 degrees around a central axis of the aperture 226, although other angles more or less than 60 degrees are contemplated. When the operating system 70 is assembled, the proximal abutment surface 230 of the spool 194 may bear against the distal face 94 of the base 74, the outer periphery of the spool 194 may be disposed radially inward of the inner annular rim 142, and the distal face 214 of the spool 194 may be approximately flush with the distal face 150 of the inner annular rim 142.

Figure 7:
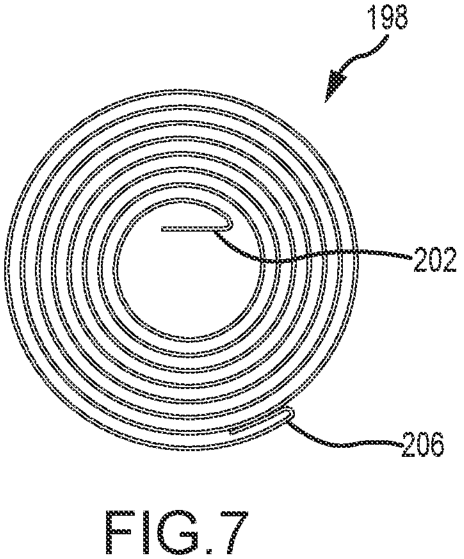
FIG. 7 is a proximal elevation view of the spool spring shown in FIGS. 6A and 6B.

The spool spring 198, as shown in FIGS. 6A through 7, is configured to provide a spool 194 retraction force and may be housed within the inner cavity 234 of the spool 194. The spool spring 198 may include a number of windings extending between an inner end portion 202 and an outer end portion 206. The inner and outer end portions 202, 206 each may be folded over to form an inner and outer hook, respectively, so that when the operating system 70 is assembled, the inner end portion 202 engages the anchor 138 of the base 74 and the outer end portion 206 engages the anchor 238 of the spool 194. In this configuration, when viewing the distal face 94 of the base 74, a clockwise rotation of the spool 194 relative to the base 74 radially contracts the windings of the spool spring 198 to create a counterclockwise biasing force, resulting in a spool retraction force.

Referring to FIGS. 6A, 8B, and 8C, the distal face 214 of the spool 194 may include an embossed ring 240 encircling the central aperture 226 and a pair of diametrically opposed clutch tabs 242 located along a radially outward portion of the ring 240. Each of the clutch tabs 242 may be formed in an apostrophe or comma shape with a radially thicker clockwise trailing edge 246 and a radially thinner clockwise leading edge 250. Each of the tabs 242 also may include a curved inner surface or wall 254 that extends between the trailing and leading edges 246, 250. Additionally, each of the tabs 242 may include a ramp or cam surface 256 that inclines outward from the leading edge 250 toward the trailing edge 246. In other words, the cam surface 256 may incline in a counterclockwise direction from the leading edge 250 of each of the tabs 242. Near the trailing edge 246 of each of the tabs 242, the ramp or cam surface 256 may terminate at a stop shoulder 258.

Referring to FIG. 8C, the spool 194 includes a circumferential groove 218 formed between the proximal and distal faces 210, 214. Although not depicted in FIG. 8C, the operating element 46 may be wound around the spool 194 and disposed within the groove 218, which may be formed to receive various lengths of the operating element 46. For example, in one implementation, about 48 inches of the operating element 48 may be wound around and located within the groove 218. To couple the operating element 48 to the spool 194, one end of the operating element 48 may be routed through a slot 262A or 262B (see FIG. 8A) formed in a proximal side wall 266A of the groove 218, placed within the inner cavity 234 of the spool 194, and knotted, secured, or otherwise configured to prevent that end of the operating element 46 from being displaced from the cavity 234. After being wound around the groove 218, the other end of the operating element 46 may be routed through a slot 270 formed in a distal side wall 266B of the groove 218 (see FIG. 8C) and temporarily secured distally of the distal side wall 266B until the spool assembly is operably coupled to the base 74.

Figure 9A:
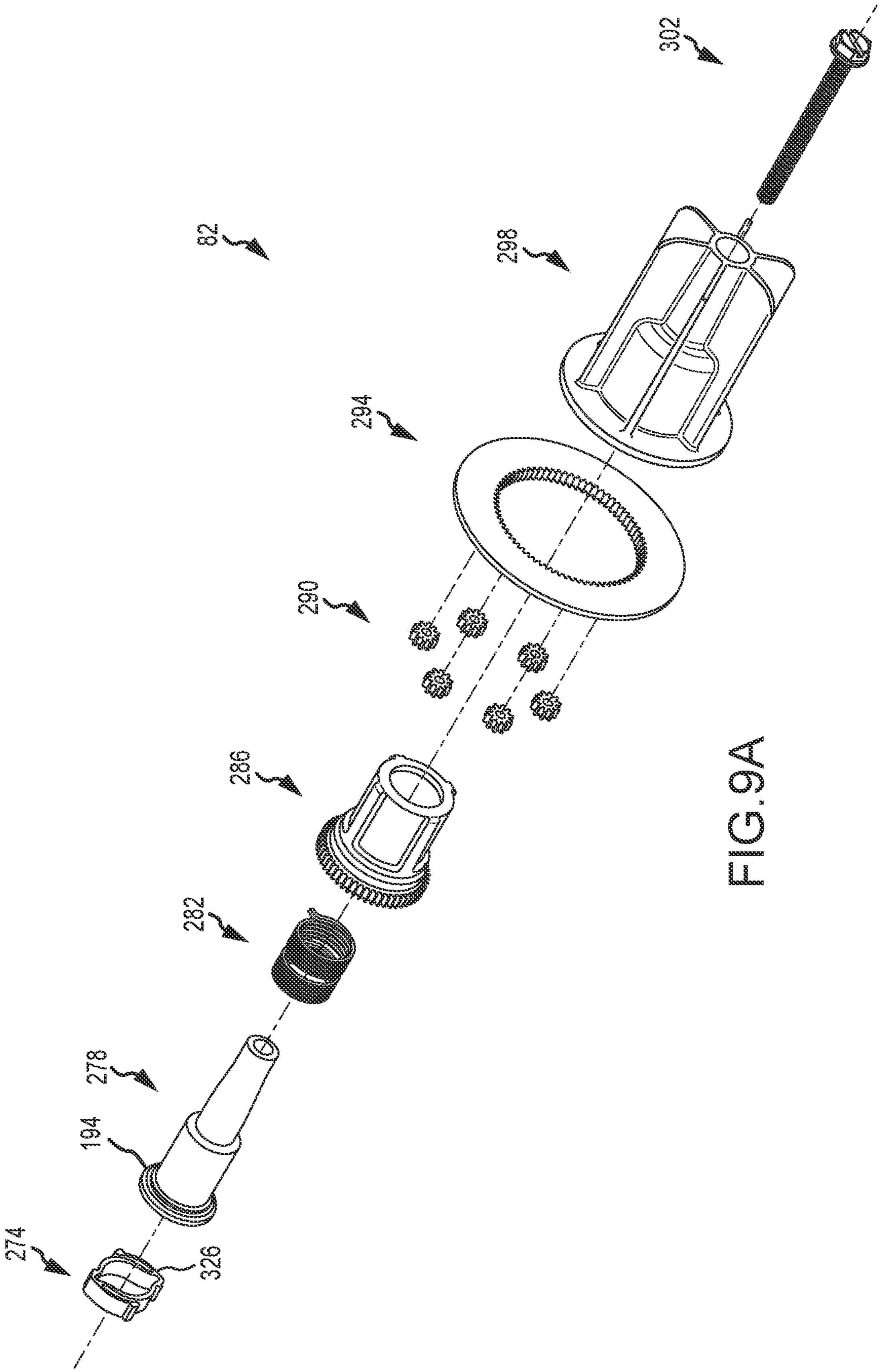
FIGS. 9A and 9B are an exploded, distal isometric view and an exploded, proximal isometric view, respectively, of the transmission shown in FIGS. 4A and 4B.
Figure 9B:
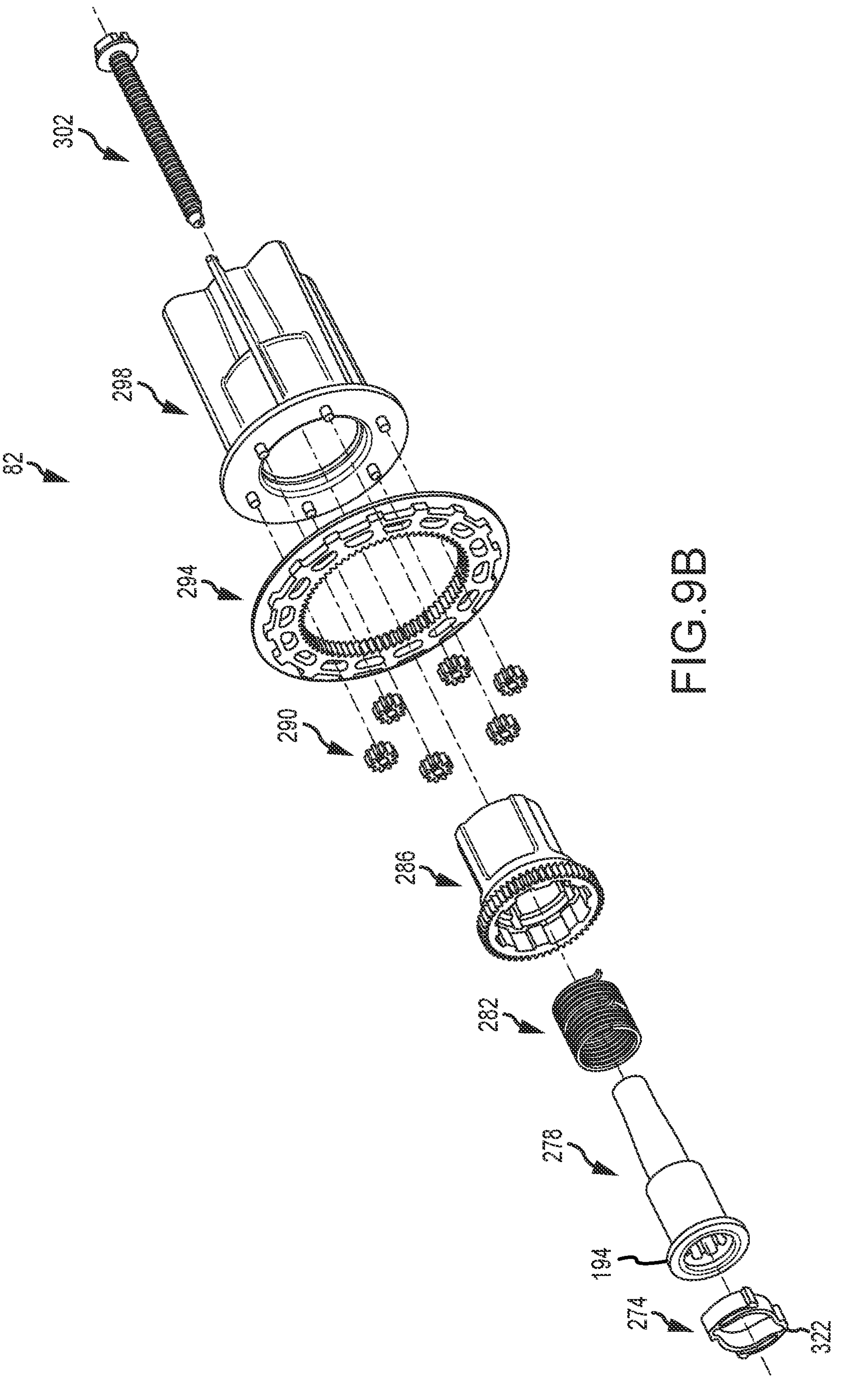

Referring now to FIGS. 9A and 9B, an example transmission 82 of the operating system 70 is shown in exploded below. The transmission 82 includes a clutch element 274, an axle 278, at least one wrap spring 282, a sun gear 286, a plurality of planet gears 290, an annulus or ring gear 294, a planet carrier 298, and a fastener 302. When assembled, the components of the transmission 82 may be coaxially aligned with the post 114 of the base 74. During shade 22 retraction, the transmission 82 generally receives an input torque from the drive mechanism 78 and provides an output torque to the roller 42. The transmission 82 may provide a gear reduction, such as by the example planetary gear system, to reduce the amount of input torque required to retract the shade 22. During shade 22 extension, the transmission 82 may be disengaged from the other components of the operating system 70 so that the roller 42 can rotate in an extension or lowering direction via gravity.

Figure 10:
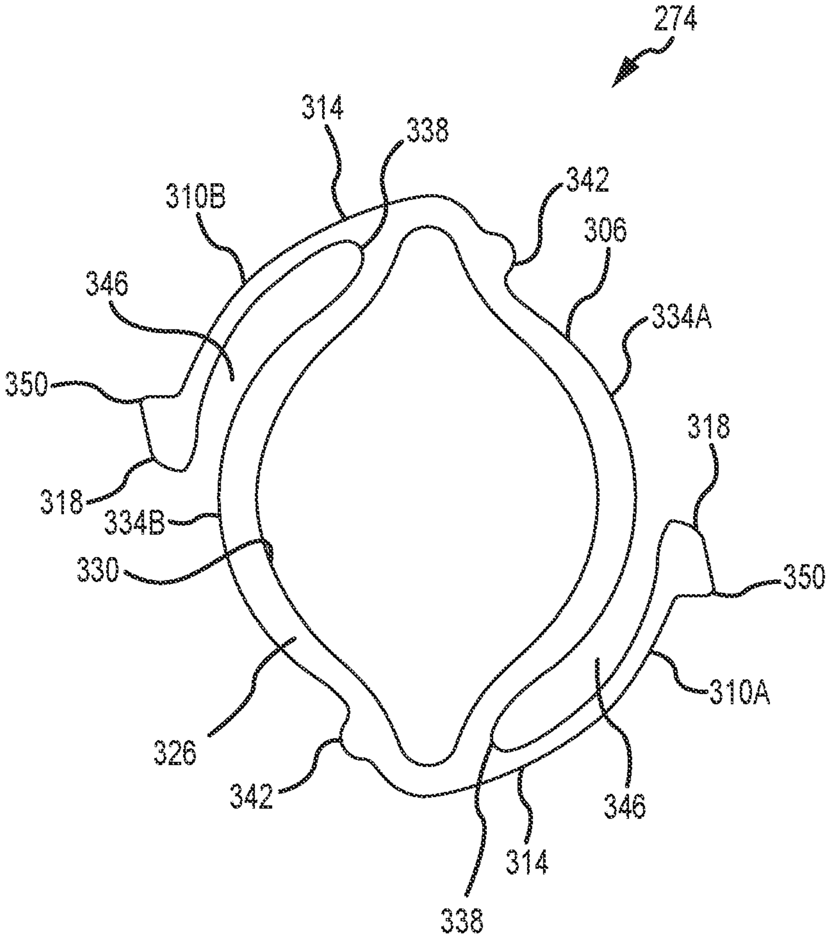
FIG. 10 is a distal elevation view of the clutch element shown in FIGS. 9A and 9B.

Referring to FIGS. 9A through 10, the clutch element 274 may serve as a one-way clutch transferring torque from the spool 194 to the sun gear 286 during extension of the operating element 46, while allowing free rotation of the spool 194 relative to the sun gear 286 during retraction of the operating element 46. With reference to FIG. 10, the clutch element 274 may include a body 306 with two resilient arms 310A, 310B each having a connected end 314 and a free end 318. The body 306 also may include an inner bearing surface 330 and opposing outer bearing surfaces 334A, 334B that each extend between proximal and distal faces 322, 326 of the clutch element 274. The outer bearing surfaces 334A, 334B each may terminate at shoulders, namely a clockwise rotation shoulder 338 and a counterclockwise rotation shoulder 342.

The resilient arms 310A, 310B each wrap about the bearing surfaces 334A, B in a radially spaced relationship and in a counterclockwise direction. Each of the resilient arms 310, in combination with a corresponding bearing surface 334, define a gap 346 closed at one end by the clockwise rotation shoulder 338 and open at the other, entrance end. The free end 318 of each of the arms 310 include an outward directed barb 350. When the operating system 70 is assembled, the inner surface 330 of the body 306 rotatably bears against the smooth portion 118 of the post 114 of the base 74 and the proximal face 322 of the body 306 abuts against the ring 240 of the spool 194.

Figure 20A:
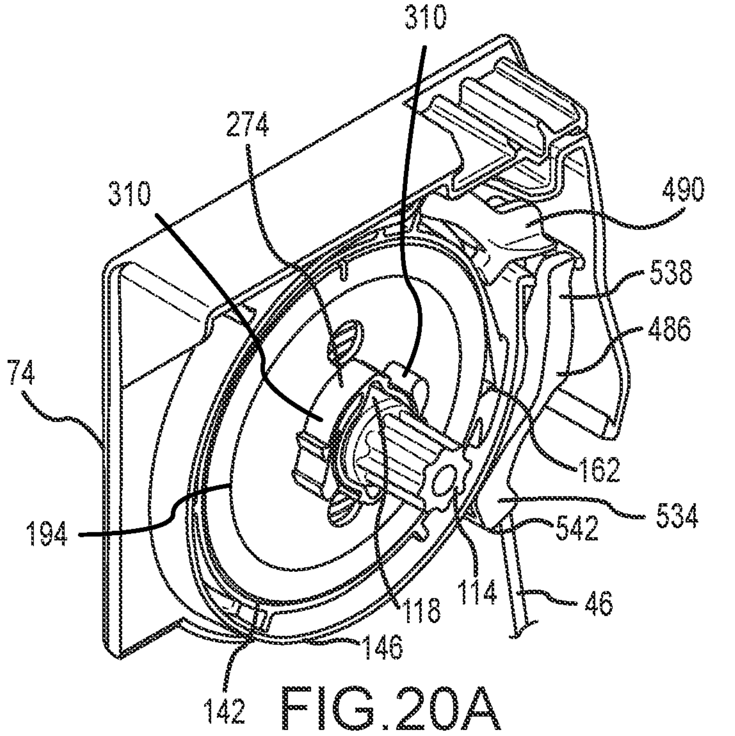
FIGS. 20A and 20B are a distal isometric view and a distal elevation view, respectively, of one example of an assembly of an end cap, a spool assembly, a clutch element, and an actuator assembly of the operating system shown in FIGS. 4A and 4B.
Figure 20B:
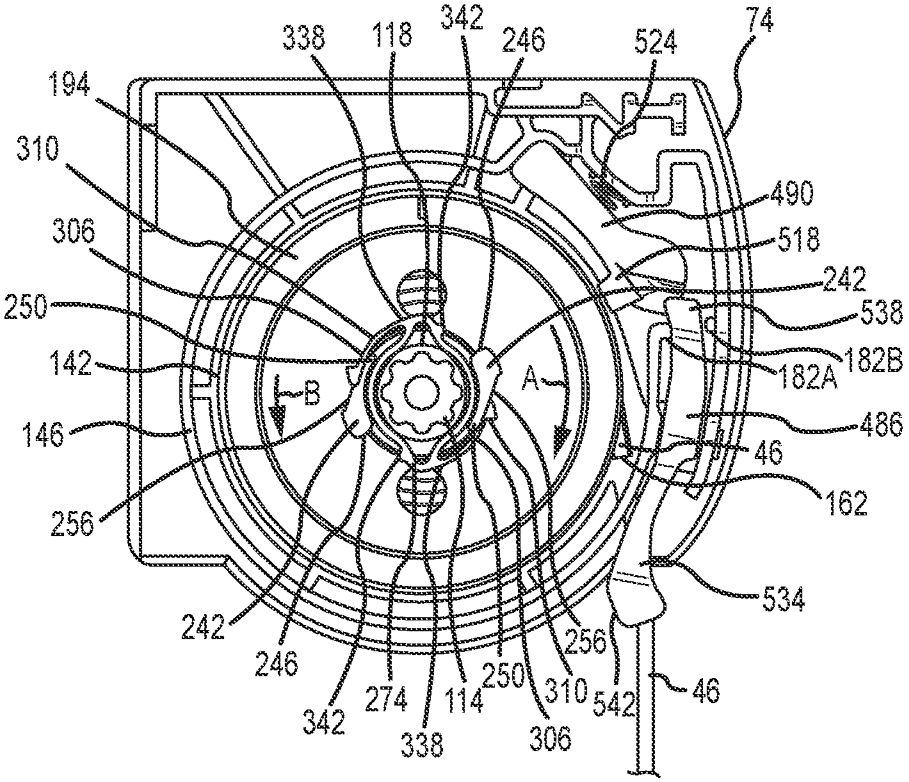

As shown in FIGS. 20A and 20B, the clutch element 274 may be axially positioned on the smooth portion 118 of the post 114 of the base 74. Upon extension of the operating element 46 (see FIGS. 1A and 1D), the spool 194 rotates in a shade retraction direction (as indicated by arrow A in FIG. 20B) about the post 114. The rotation of the spool 194 moves the clockwise leading edge 250 of each of the clutch tabs 242 radially between the resilient arms 310 and the body 306 of the clutch element and towards the clockwise rotation shoulder 338 located at the intersection of the arms 310 and the body 306. As the leading edges 250 of the clutch tabs 242 move toward the shoulder 338, the resilient arms 310 ride up the cam surfaces 256 of the clutch tabs 242 and are expanded radially outward, thereby increasing the effective outer diameter of the clutch element 274. Once the stop shoulders 258 of the clutch tabs 242 contact the free ends 318 of the resilient arms 310, the clutch tabs 242 drive the arms 310, and hence the clutch element 274, in a clockwise direction.

During retraction of the operating element 46 (see FIG. 1C), the spool 194 rotates in a shade extension direction (as indicated by arrow B in FIG. 20B) about the post 114. The shade extension rotation of the spool 194 moves the clockwise trailing edge 246 of each of the clutch tabs 242 towards the counterclockwise rotation shoulder 342. As the trailing edges 246 of the clutch tabs 242 move toward the shoulder 342, the resilient arms 310 descend down the cam surfaces 256 of the clutch tabs 242 and contract radially inward to a non-deformed state, thereby decreasing the effective outer diameter of the clutch element 274. Once the trailing edges 246 of the clutch tabs 242 contact the shoulder 342, the clutch tabs 242 drive the clutch element 274 in the shade extension direction. However, as will be discussed below, the decreased effective outer diameter of the clutch element 274 isolates the rotation of the spool 194 from the transmission 82, thereby enabling retraction of the operating element 46 without impacting the position of the shade 22.

Figure 11A:
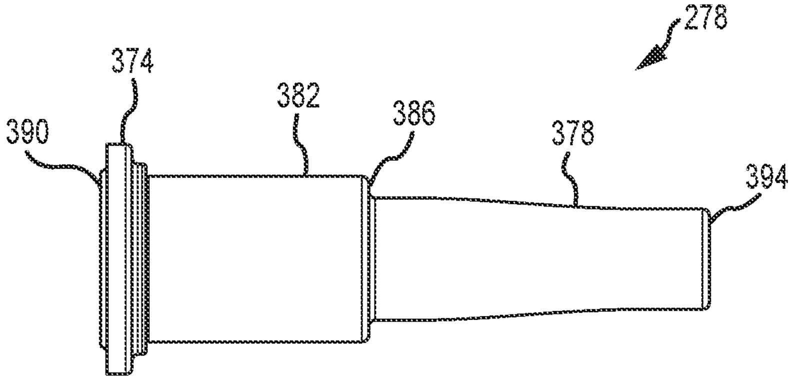
FIGS. 11A and 11B are a side elevation view and a proximal cross-sectional isometric view, respectively, of the axle shown in FIGS. 9A and 9B.
Figure 11B:
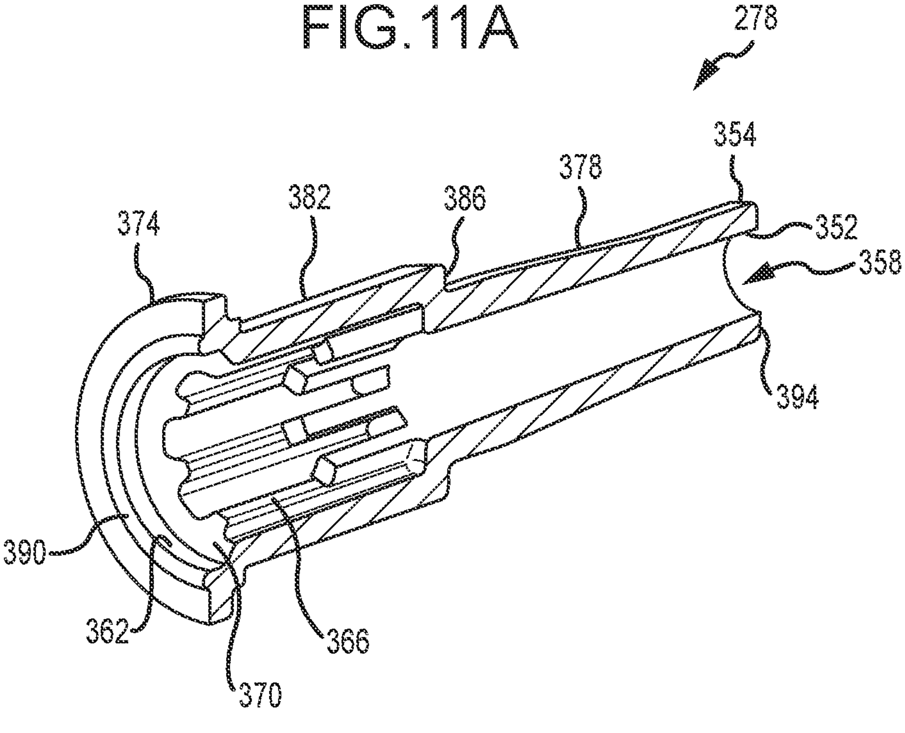

Referring to FIGS. 9A, 9B, 11A, and 11B, one example of an axle 278 of the operating system 70 is provided. When the operating system 70 is assembled, the axle 278 is keyed to the base 74 to prevent rotation of the axle 278 relative to the base 74. That is, the axle 278 is non-rotatably coupled to the base 74. Referring to FIGS. 11A and 11B, the example axle 278 includes an interior wall 352 and an exterior wall 354. The interior wall 352 may define a bore 358 extending longitudinally through the axle 278. The proximal portion of the interior wall 352 may include a cylindrical section 362, a splined section 366, and a transition section 370 located intermediate the cylindrical section 362 and the splined section 366. The cylindrical section 362 may have a larger diameter than the splined section 366, which includes alternating ribs and grooves. The transition section 370 may be arcuate, curved, or chamfered. The distal portion of the interior wall 352 may be substantially smooth and cylindrical. When the operating system 70 is assembled, the cylindrical section 362 may abut the smooth portion 118 of the post 114 of the base 74, the splined section 366 may matingly engage the splined portion 122 of the post 114, and the proximal face of the stepped shoulder of the splined section 366 may abut the distal face of the post 114.

The exterior wall 354 of the axle 278 may include a radially-extending flange 374, a tapered distal surface 378, and a cylindrical surface 382 located intermediate the flange 374 and the tapered surface 378. A step shoulder 386 may be formed between the larger diameter cylindrical surface 382 and the smaller diameter tapered surface 378. The axle 278 also may include a proximal face 390 and a distal face 394. When the operating system 70 is assembled, the proximal face 390 may abut the distal face 326 of the clutch element 274 and the distal face 394 may bear against the underside of the head of the threaded fastener 302.

Figure 22A:
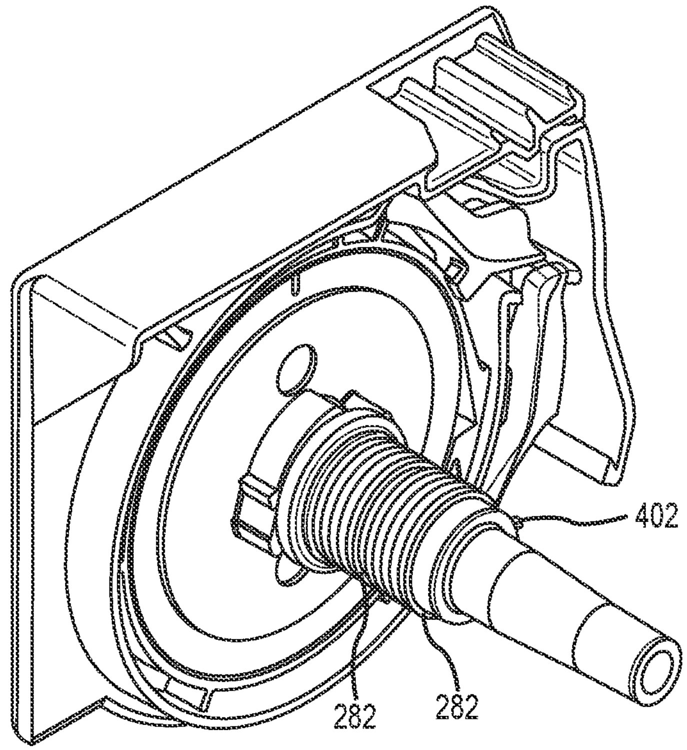
FIGS. 22A and 22B are a distal isometric view and a distal elevation view, respectively, of an assembled base, drive mechanism, clutch element, axle, brake mechanism, and actuator assembly of the operating system shown in FIGS. 4A and 4B.
Figure 22B:
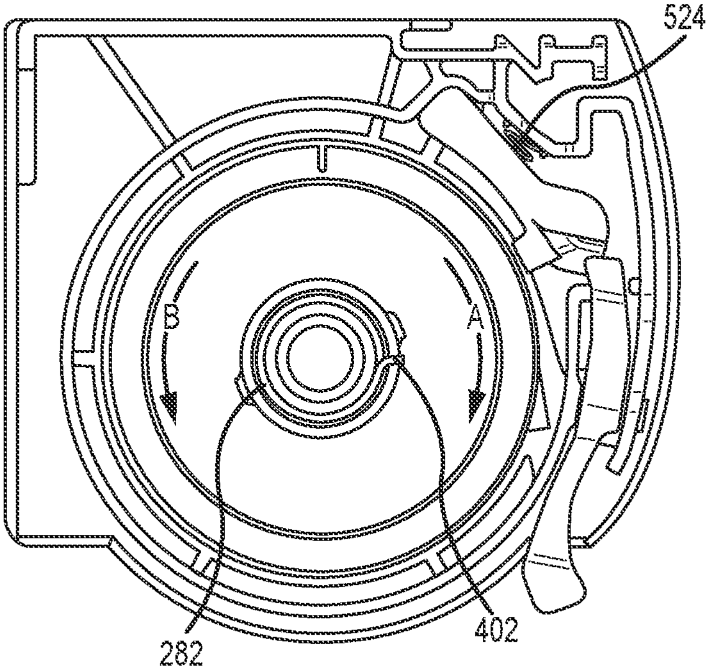

Referring to FIGS. 9A, 9B, 12A, and 12B, a brake element or mechanism is provided. The example brake element includes two identical wrap springs 282. When the operating system 70 is assembled, the wrap springs 282 are interference fit onto the cylindrical section 362 of the axle 278, as shown in FIGS. 22A and 22B. As such, the wrap springs 282 function as a one-way brake and are configured to rotationally slip around the axle 278 in a shade retraction direction (as indicated by arrow A in FIG. 22B) and clamp or lock onto the axle 278 in a shade extension direction (as indicated by arrow B in FIG. 22B). Thus, in one implementation, as the operating element 46 is extended from the spool 194, the spool 194 rotates and the wrap springs 282 rotationally slip about the axle 282 to raise or retract the shade 22. However, as the operating element 46 is reeled in by the spool 194, the wrap springs 282 lock about the axle 278 to prevent unintentional extension or lowering of the shade 22.

Figure 12A:
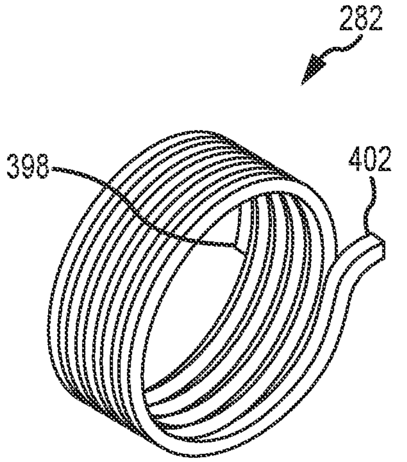
FIGS. 12A and 12B are a distal isometric view and a distal elevation view, respectively, of one of the wrap springs shown in FIGS. 9A and 9B.
Figure 12B:
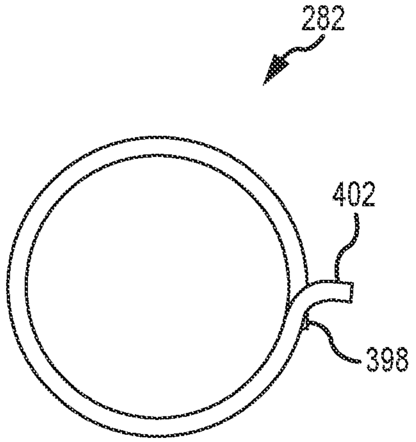

With reference to FIGS. 12A and 12B, each wrap spring 282 includes terminal end segments 398, 402 spatially separated by a number of windings. One end segment 398 may be directed slightly outward to prevent inadvertent catching, gouging, or scarring of the cylindrical section 362 of the axle 278. The other end segment 402 may extend radially outward to form a tang. Although two wrap springs 282 are provided for illustrative purposes, other configurations are contemplated. For instance, any number of wrap springs 282, such as one, two, or more than two, may be utilized. In addition, if a plurality of wrap springs 282 are used, the wrap springs 282 may be different from each other.

Referring to FIGS. 9A, 9B, 13A, and 13B, an example sun gear 286 of the transmission 82 is provided. The sun gear 286 may include external gear teeth 404 and a hollow interior. The sun gear 286 also may include an inner surface defining a proximal clutch portion 406 and a distal brake portion 410. The clutch portion 406 may include circumferentially spaced, radially-inward directed ridges 414 that define recesses 418 between the ridges 414. The clutch portion 406 may receive the clutch element 274, as shown in FIGS. 21A through 21D.

Figure 21A:
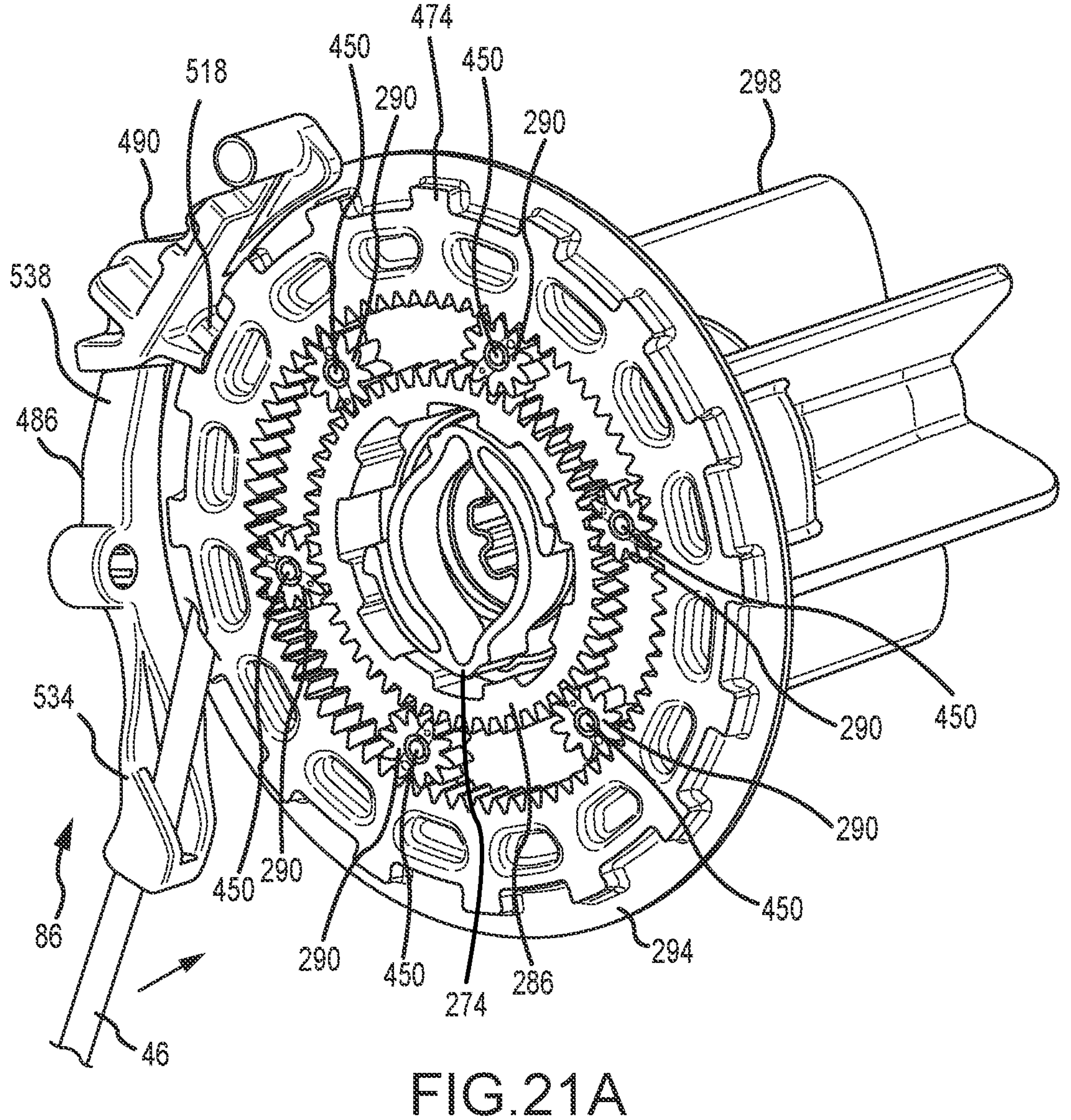
FIG. 21A is a proximal isometric view of the transmission and the actuator assembly shown in FIGS. 4A and 4B positioned in a retraction mode.
Figure 21B:
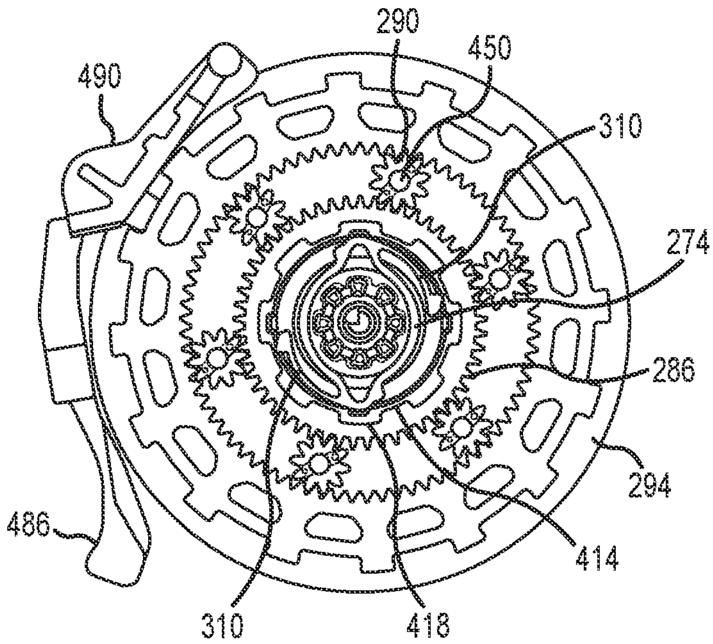
FIGS. 21B and 21C are proximal elevation views of the transmission and the actuator assembly shown in FIG. 21A with the clutch element in a disengaged and an engaged position, respectively.

When the resilient arms 310 of the clutch element 274 are in a non-deformed state, as shown in FIG. 21B, the effective outer diameter of the clutch element 274 is smaller than the inner diameter of the ridges 414 of the sun gear 286. As previously discussed, the clutch element 274 may be in a non-deformed state, and thus may rotate within the sun gear 286 without interference, when the spool 194 rotates in a shade extension direction. As such, during retraction of the operating element 46, the clutch element 274 may rotatably isolate the sun gear 286 from the spool 194 or any other suitable drive mechanism.

Figure 21C:
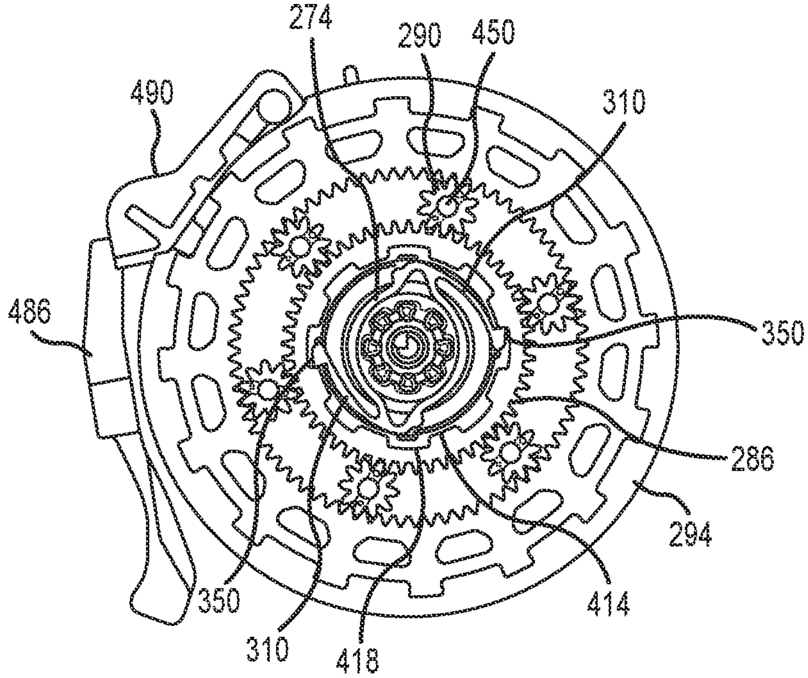

When the resilient arms 310 of the clutch element 274 are in a deformed state, as shown in FIG. 21C, the barbs 350 of the radially-expanded, resilient arms 310 are located within opposing recesses 418 and engage opposing ridges 414 to transfer rotation of the spool 194 to the sun gear 286. As previously discussed, the clutch element 274 may be in a radially-expanded state, and thus rotatably couple the sun gear 286 to the spool 194, when the spool 194 rotates in a shade retraction direction. As such, during extension of the operating element 46, the clutch element 274 may rotatably couple the sun gear 286 to the spool 194 (as shown in FIG. 21C) or any other suitable drive mechanism.

Figure 13A:
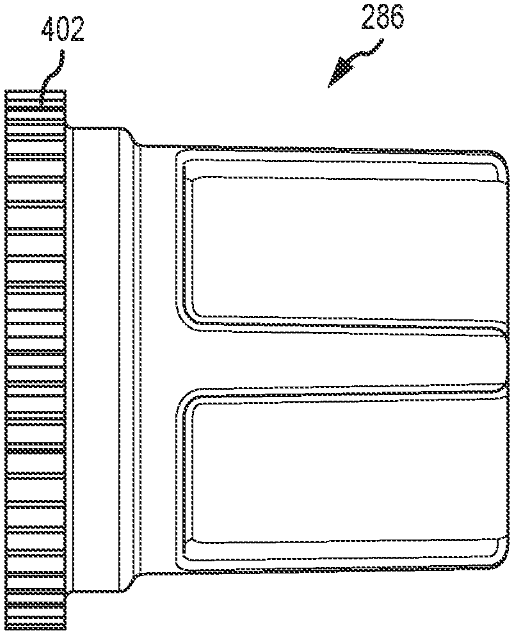
FIGS. 13A and 13B are a side elevation view and a proximal cross-sectional isometric view, respectively, of the sun gear shown in FIGS. 9A and 9B.
Figure 13B:
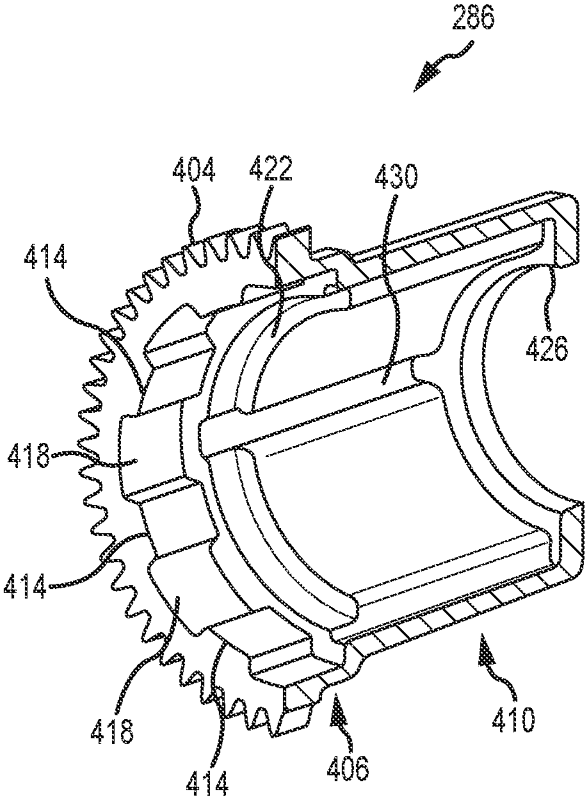
Figure 14A:
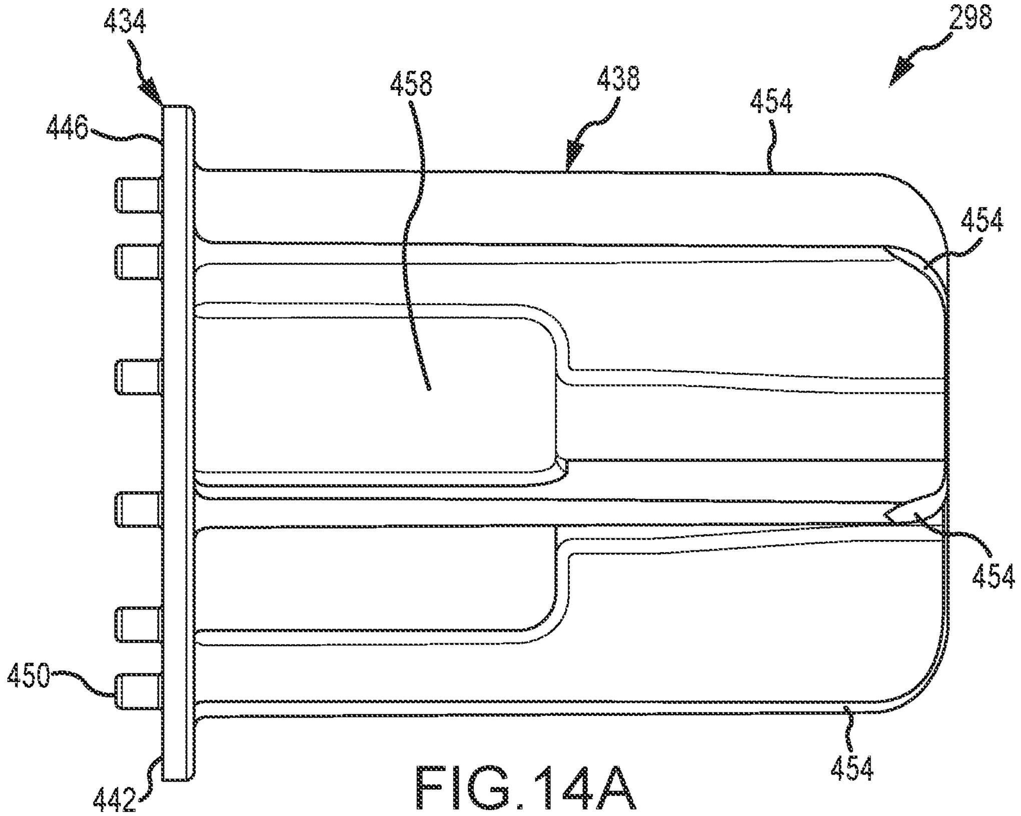
FIGS. 14A and 14B are a side elevation view and a proximal cross-sectional isometric view, respectively, of the planetary gear carrier shown in FIGS. 9A and 9B.
Figure 14B:
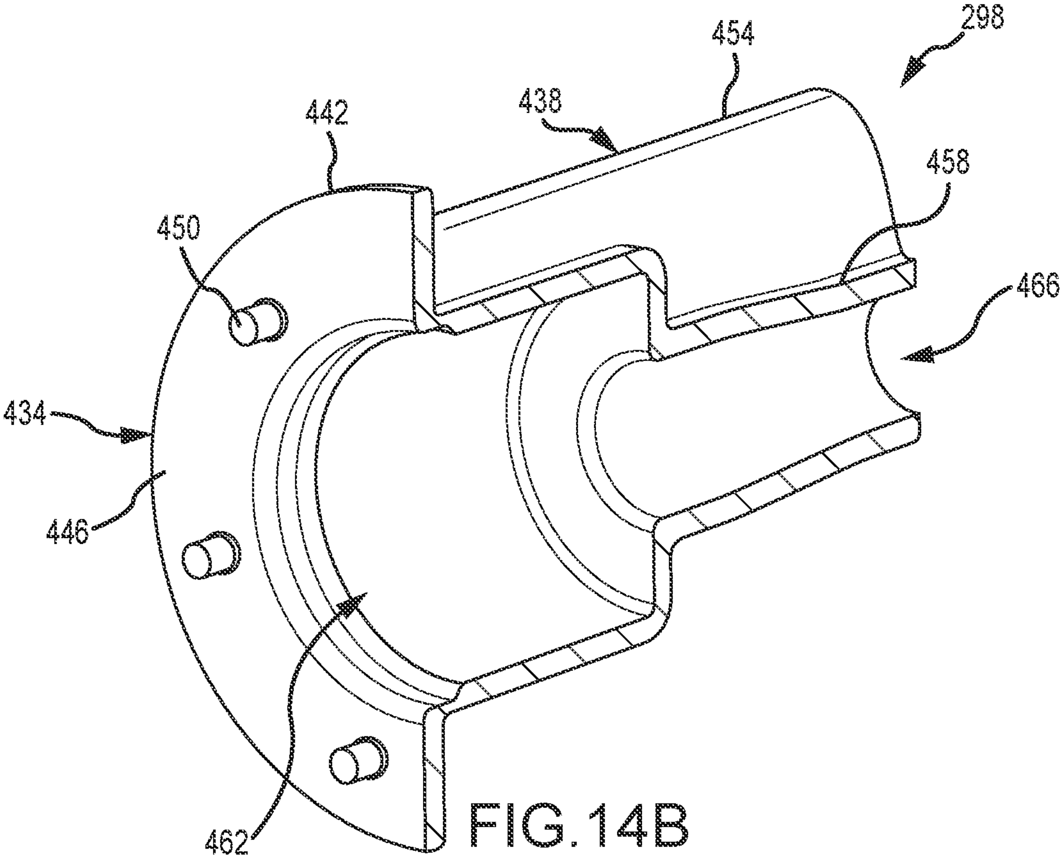
Figure 15A:
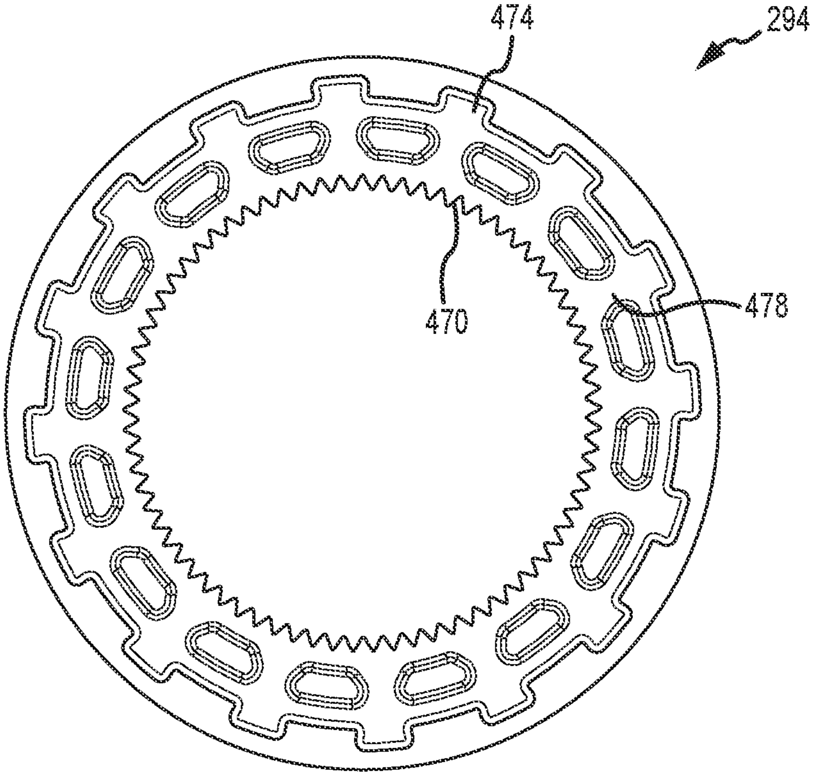
FIGS. 15A and 15B are a proximal elevation view and a side elevation view, respectively, of the ring gear shown in FIGS. 9A and 9B.
Figure 15B:
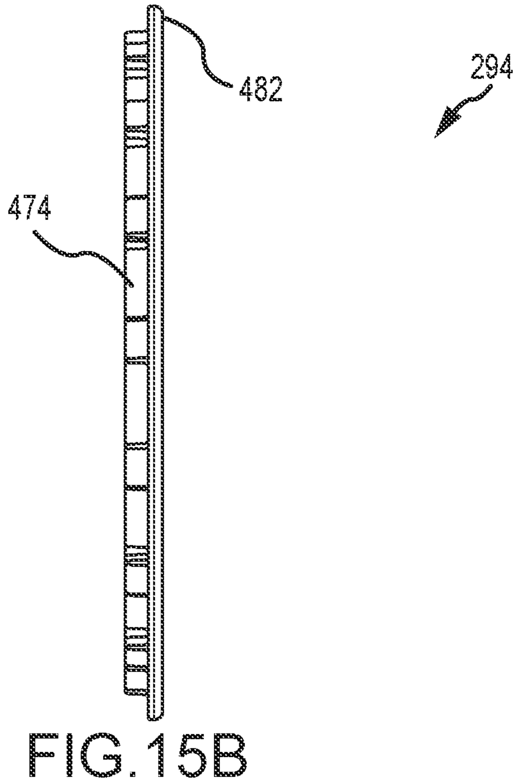

With reference to FIG. 13B, the brake portion 410 of the sun gear 286 may extend distally from the clutch portion 406. The brake portion 410 may include a counterbore section 422, a radially inturned lip 426, and at least one slot 430 extending longitudinally between the proximal counterbore section 422 and the distal lip 426. The counterbore section 422 may be configured to seat the flange 374 of the axle 278. When assembled, the proximal face 390 of the axle 278 may be approximately flush or congruent with the leading proximal edge of the brake portion 410 (as shown in FIG. 25B). Also when assembled, the radially inturned lip 426 may rotatably bear against a distal portion of the cylindrical surface 382 of the axle 278 and may be distally aligned with the step shoulder 386 of the axle 278 (see FIG. 25B). The radially inturned lip 426 also may axially retain the wrap spring 282 around the cylindrical surface 382 of the axle 278.

Figure 23:
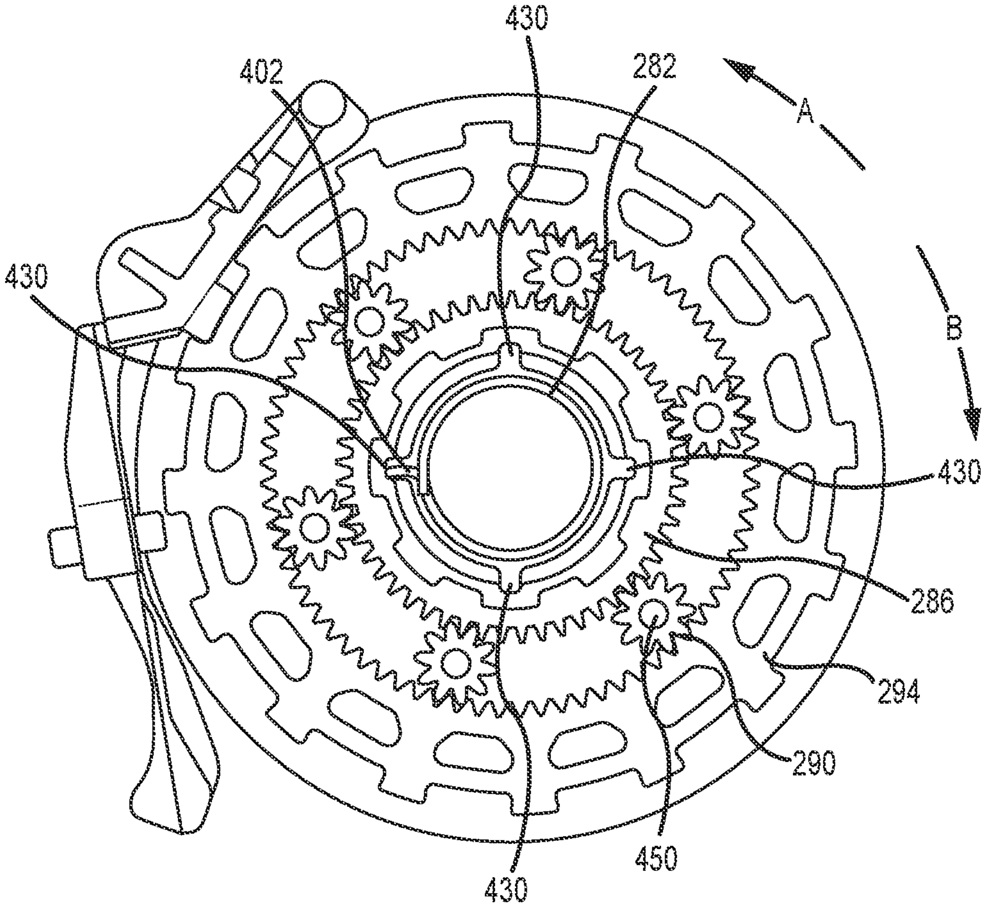
FIG. 23 is a proximal elevation view of the transmission and the actuator assembly with the axle removed to illustrate the interaction between the wrap springs and the sun gear.

The at least one slot 430 of the brake portion 410 of the sun gear 286 may be configured to receive the tangs 402 of the wrap springs 282 to rotatably lock the wrap springs 282 and the sun gear 286 depending on the direction of rotation. As shown in FIG. 23 (axle 278 is removed for clarity), two wrap springs 282 are positioned coaxially within the sun gear 286. The tang 402 of each wrap spring 282 extends into one of the four circumferentially spaced slots 430 so that the rotation of the sun gear is rotatably linked to each wrap spring 282.

With continued reference to FIG. 23, upon extension of the operating element 46 (see FIGS. 1B and 1D), the spool 194 rotates in a shade retraction direction (as indicated by arrow A in FIG. 23), the clutch tabs 242 radially expand the resilient arms 310, and the barbs 350 engage the ridges 414 of the clutch portion 406 of the sun gear 286 to transmit the spool 194 torque to the sun gear 286. Upon rotation of the sun gear 286 in the shade retraction direction, a wall of the slot 430 contacts the tang 402 of the wrap springs 282 and radially expands the windings of the at least one wrap spring 282. The radial expansion of the windings permits the wrap springs 282 to rotationally slip around the stationary axle 278 in the shade retraction direction.

Upon retraction of the operating element 46 (see FIG. 1C), the spool 194 rotates in a shade extension direction (as indicated by arrow B in FIG. 23), the clutch tabs 242 contact the counterclockwise rotation shoulders 342, and the clutch element 274 rotates freely within the clutch portion 406 of the sun gear 286 without transmitting the spool 194 torque to the sun gear 286. Thus, torque from the spool 194 is not transmitted to the sun gear 286 in the shade extension direction.

In addition to the clutch element 274 not transmitting torque in the shade extension direction from the spool 194 to the sun gear 286, the wrap springs 282 may prevent the sun gear 286 from rotating in the shade extension direction due to the weight of the shade 22 imparting a shade extension torque on the roller 42. Upon rotation of the sun gear 286 in the shade extension direction, a wall of the slot 430 contacts the tang 402 of the wrap springs 282 and radially contracts the windings about the cylindrical surface 382 of the axle 278. The radial contraction of the windings prevents rotation of the sun gear 286 about the stationary axle 278 in the shade extension direction. In this manner, the wrap springs 282 act as a brake mechanism to lock or maintain the desired position of the shade 22 relative to the architectural opening.

Referring to FIGS. 9A, 9B, 14A, and 14B, an example planetary gear carrier 298 of the transmission 82 is provided. The planetary gear carrier 298 may include a carrier portion 434 and a bearing portion 438. The carrier portion 434 may include a radially extending flange 442 with a proximal face 446. The carrier portion 434 also may include a plurality of pins 450 that extend proximally from the face 446. Each of the pins 450 may support a planet gear 290 (shown in FIGS. 9A and 9B). The carrier portion 434 may include any suitable number of pins 450. In one implementation, the carrier portion 434 includes at least three pins 450. In the depicted implementation, the carrier portion 434 includes six pins 450.

The bearing portion 438 of the gear carrier 298 may be configured to fit into an end of the roller 42 and transmit motion between the gear carrier 298 and the roller 42. The bearing portion 438 may include a plurality of ribs 454 extending distally from the flange 442 and radially outward from a tiered wall 458. The ribs 454 may be configured to rotatably couple the gear carrier 298 and roller 42. For example, the ribs 454 may frictionally engage an inner portion of the roller 42, may key into corresponding interior features of the roller, or otherwise couple the components together. The bearing portion 438 may include any suitable number of ribs 454. In one implementation, the plug portion 438 includes at least three ribs 454. In the depicted implementation, the plug portion 438 includes six ribs 454 (see FIG. 9A).

The tiered wall 458 of the gear carrier 298 may define a larger diameter proximal cavity 462 and a smaller diameter distal cavity 466. The proximal cavity 462 may be configured to house the sun gear 286 (except for the external gear teeth 404). The distal cavity 466 may be configured to house, and may radially abut, the tapered surface 378 of the axle 278. Although depicted as an integral unit, the carrier portion 434 and the bearing portion 438 of the gear carrier 298 may be individual components that are coupled together.

Referring to FIGS. 9A, 9B, 15A, and 15B, an example annulus or ring gear 294 of the transmission 82 is provided. The ring gear 294 may include inwardly directed gear teeth 470, outwardly directed teeth 474 located radially outward from the gear teeth 470, and a series of bridges 478 extending radially between the inwardly directed gear teeth 470 and the outwardly directed teeth 474. The bridges 478 may be spaced apart from one another to reduce the amount of material, and thus the weight, of the ring gear 294. In some implementations the ring gear 294 may be constructed of plastic, in which case the spaces between the bridges 478 may reduce warpage, sinks, and/or voids. The ring gear 294 may include a circumferential flange or cap 482 extending radially outward and distally from the outward directed teeth 474.

With reference to FIGS. 21A through 21D and FIG. 23, when the operating system 70 is assembled, the planet gears 290 mesh between the sun gear 286 and the ring gear 294. The sun gear 286, planet gears 290, ring gear 294, and planet carrier 298 generally form a planetary gear set or gear reduction unit, thereby reducing the amount of force required to retract or raise the shade 22. In one implementation, the gear ratio of the planetary gear set is 2.5.

As previously discussed, during extension of the operating element 46 (see FIGS. 1B and 1D), the sun gear 286 rotates relative to the stationary axle 278 in a shade retraction direction. If the ring gear 294 is rotatably locked during this rotation of the sun gear 286, the planet gears 290 rotate about their respective pins 450 and orbit around the sun gear 286. The orbiting motion of the planet gears 290 rotate the planet carrier 298, which in turn rotates the roller 42 in a shade retraction direction.

During retraction of the operating element 46 (see FIG. 1C), the sun gear 286 is rotatably isolated from the spool 294 and thus does not rotate the planet carrier 298. In addition, during retraction of the operating element 46, the weight of the shade 22 suspended from one edge of the roller 42 may impart a torque on the roller in the shade extension direction. This torque may be transferred to the planet gears 290 through the planet carrier 298. As previously discussed, the wrap springs 282 may prevent rotation of the sun gear 286 in the shade extension direction. Thus, if the sun gear 286 and the ring gear 294 are rotatably locked, the planet gears 290 are prevented from moving, which in turn maintains the shade 22 in the current position. Alternatively, if the ring gear 294 is not rotatably locked, the planet gears 290 may orbit about the sun gear 286 in the shade extension direction to extend the shade 22 across the architectural opening.

Figure 20C:
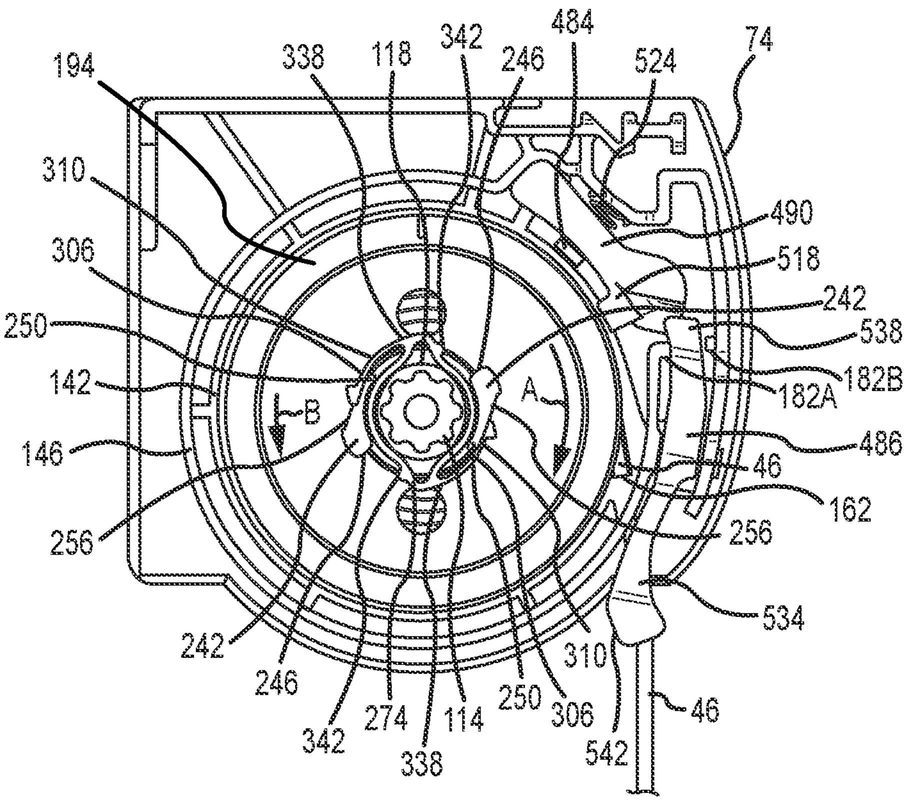
FIG. 20C illustrates the assembly of FIG. 20B with an electrically controllable actuator mechanism.

Referring now to FIGS. 4A, 4B, and 16A through 19, an example actuator or shift mechanism 86 of the operating system 70 is provided. The actuator mechanism 86 selectively engages the transmission 82 to transition the operating system 70 between retraction and extension modes. Although the following discussion describes an actuator mechanism 86 shifted mechanically by an operating element 46, the actuator mechanism 86 may be mechanically and/or electrically actuated. For instance, as shown in FIG. 20C, an electrically-controlled actuator 484 may be attached to the base 74 and positioned to selectively shift the actuator mechanism 86 between retraction and extension modes. The actuator 484 may interact with the actuator mechanism 86 in various manners, such as electromagnetically, to move the actuator mechanism 86. The actuator 484 may be electrically coupled with a transceiver operable to receive signals from a remote transmitter, such as a remote-control unit 45 (see FIG. 1G), and transmit signals to a remote receiver. Electrically-controlled linear and/or rotary actuators may be used.

In one implementation, an operator shifts the actuator mechanism 86 between modes by manipulating an operating element 46 in a predefined direction. For instance, the operator may pull the operating element 46 across the face of the shade 22 in a diagonal or lateral movement (e.g., arrow 54C in FIG. 1E) to shift the actuator mechanism 86 into a shade extension mode, thereby permitting the shade 22 to automatically extend or lower, such as via gravity. Once in the shade extension mode, the operator may shift the actuator mechanism 86 into a shade retraction mode (which stops the extension) by pulling the operating element 46 vertically downward or in a direction opposite to that shown in FIG. 1E.

Referring to FIGS. 16A, 16B, 21A, and 21D, the actuator mechanism 86 may include an engagement or lock arm 490 and an actuator or shift arm 486. The lock arm 490 may be pivotably associated with the base 74 of the operating system 70. In one implementation, the lock arm 490 has a preset pivotable range. At one end of the pivotal range, the lock arm 490 engages the transmission 82 to substantially prevent rotation of the roller 42 in a shade extending direction, which may be referred to as the shade retraction mode. At the other end of the pivotal range, the lock arm 490 disengages from the transmission 82 to permit rotation of the roller in the shade extending direction, which may be referred to as the shade extension mode. The lock arm 490 may be biased toward the shade retraction mode by a biasing element such as a spring.

An example lock arm 490 is provided in FIGS. 17A through 17F. The lock arm 490 may include a post 494 configured to be rotatably seated within the pivot aperture 170 of the base 74, a cutout 498 configured to receive a portion of the boss 166, and an overpass 502 located distally of the cutout 498 and configured to be seated within the recessed portion 174 of the boss 166 to limit the pivotal range of the lock arm 490. The post 494, the boss 166, or both may include catch or snap features to axially interlock the post 494 within the pivot aperture 170 while permitting rotation of the lock arm 490 relative to the base 74. A biasing element, such as a torsion spring, may be associated with the post 494 and the boss 166 to rotationally bias the lock arm 490 toward the shade retraction mode, for example. The pivot axis of the lock arm 490 may be generally parallel to a central longitudinal axis of the transmission 82. When assembled, the post 494 may extend in a proximal direction towards the base 74 and away from the roller 42.

The lock arm 490 also may include an engagement tooth 518 configured to engage the transmission 82 when the actuator mechanism 86 is in the shade retraction mode. When the actuator mechanism 86 is in the shade retraction mode, as shown in FIGS. 21A through 21C, the engagement tooth 518 of the lock arm 490 may matingly engage or intermesh with the outwardly directed teeth 474 of the ring gear 294 to substantially prevent rotation of the ring gear 294. When the actuator mechanism 86 is in the shade extension mode, the lock arm 490 may be pivoted away from the transmission 82 so that the engagement tooth 518 is spatially separated from the outwardly directed teeth 474 of the ring gear 294 to permit rotation of the ring gear 294. The tooth 518 may include a buttress or rib 520 extending proximally from the tooth 518 to provide additional rigidity to the tooth 518. The distal surface 526 of the lock arm 490, including the engagement tooth 518, may be approximately planar and configured to abut the proximal face of the circumferential flange or cap 482 of the ring gear 294.

As previously discussed, the actuator mechanism 86 may be biased toward the shade retraction mode. In the implementation depicted in FIGS. 17A through 17F, the lock arm 490 includes a mandrel 522 configured to seat one end of a compression spring 524 (shown in FIGS. 20B and 22B), with the other end of the compression spring 524 seated within the placement tabs 178 protruding from the flange 98 of the base 74 (see FIG. 5A). In this implementation, the compression spring 524 pivots the lock arm 490 into the shade retraction mode in which the engagement tooth 518 is engaged with an outwardly directed tooth 474 of the ring gear 294 to prevent rotation of the ring gear 294. The mandrel 522 may be conical, cylindrical, or any other suitable shape.

With continued reference to FIGS. 17A through 17F, the lock arm 490 additionally may include a biasing or contact surface 506, a retention surface 510, and a detent 514 located intermediate the contact surface 506 and the retention surface 510. The contact surface 506 may extend in a distal direction from the detent 514 at an oblique angle relative to a longitudinal plane. The retention surface 510 may extend in a proximal direction from the detent 514 in a parallel relationship to a longitudinal plane. In other words, the biasing or contact surface 506 may be oriented at an oblique angle relative to the retention surface 510. The detent 514 may protrude outward from the lock arm 490 relative to the contact surface 506 and the retention surface 510, both of which may be substantially planar. The contact surface 506, the retention surface 510, and/or the detent 514 may be formed of a wear resistant material, which may be uniform with the lock arm 490. In one implementation, the contact surface 506, the retention surface 510, and/or the detent 514 may be plated, treated, or otherwise associated with nickel or any other suitable material to provide wear resistance.

To transition the actuator mechanism 86 between modes, the actuator mechanism 86 may include a shift arm 486 configured to manipulate the position of the lock arm 490 relative to the transmission 82. The shift arm 486 may be rotatably coupled to the base 74 of the operating system 70 and may have a preset rotatable range. At one end of the rotatable range, the shift arm 486 disengages the lock arm 490 from the transmission 82 to permit rotation of the roller 42 in a shade extending direction, generally referred to as the shade extension mode (see FIGS. 16B and 21D). At the other end of the rotatable range, the shift arm 486 does not interfere with the engagement of the lock arm 490 and the transmission 82, generally referred to as the shade retraction mode (see FIGS. 16A and 21A through 21C). When the operating system 70 is in the shade extension mode, the shift arm 486 may retain the lock arm 490 in a disengaged position relative to the transmission 82 until an external force pivots or rotates the shift arm 486 about the cross pin 190, moving a lower portion of the shift arm 486 toward the base 74 and an upper portion of the shift arm 486 away from the base 74, thereby shifting the operating system 70 into the shade retraction mode. The rotation axis of the shift arm 486 may be approximately perpendicular to the pivot axis of the lock arm 490.

Figure 5C:
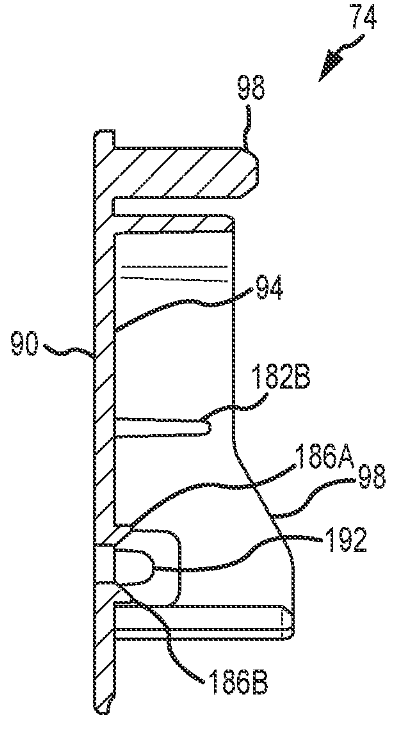

An example shift arm 486 is provided in FIGS. 18A through 18E. The shift arm 486 may include a pin housing 530 configured to receive a cross pin 190 (shown in FIG. 19). As such, the cross pin 190, the pin housing 530, or both may serve as a pivot point or fulcrum for the shift arm 486. With reference to FIGS. 5A and 5C, the pin housing 530 may be rotatably seated between the protuberances 186A, 186B and the ends of the cross pin 190 may be rotatably seated in opposing recesses or openings in the rim 146 and the flange 98, such as the aperture 192 formed in the flange 98.

At one end of the rotatable range of the shift arm 486, the shift arm 486 engages the lock arm 490, causing the lock arm 490 to disengage the outward facing teeth 474 of the ring gear 294, generally referred to as the shade extension mode. In this mode (see FIGS. 16B and 21D), the lock arm 490 permits rotation of the ring gear 294, thereby permitting extension of the shade 22, which may be under the effect of gravity. At the other end of the rotatable range of the shift arm 486, the shift arm 486 does not displace the lock arm 490, allowing the lock arm 490 to engage the ring gear 294 under spring load, generally referred to as the shade retraction mode. In this mode (see FIGS. 16A and 21A through 21C), the lock arm 490 prevents rotation of the ring gear 294, thereby preventing extension of the shade 22 and enabling retraction of the shade 22.

Figure 18A:
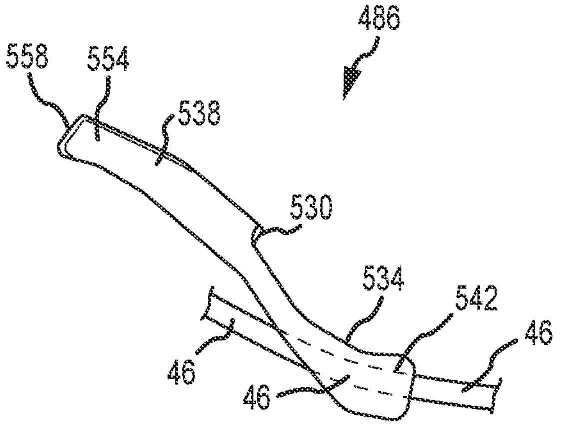
FIGS. 18A through 18E are a distal elevation view, a proximal elevation view, a side elevation view, another side elevation view, and yet another side elevation view of the shift arm shown in FIGS. 16A and 16B.
Figure 18B:
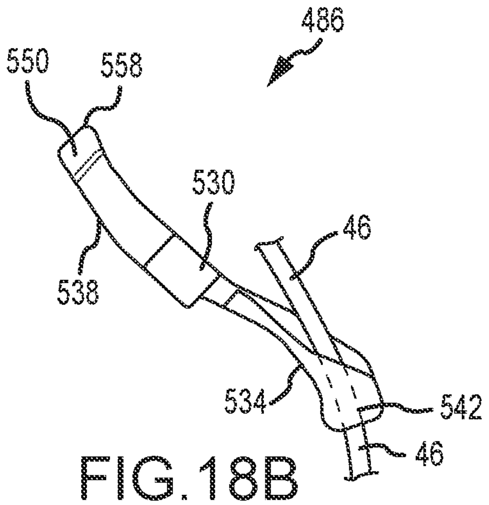
Figure 18C:
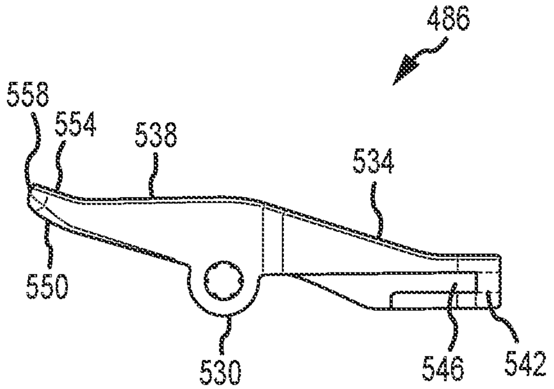
Figure 18D:
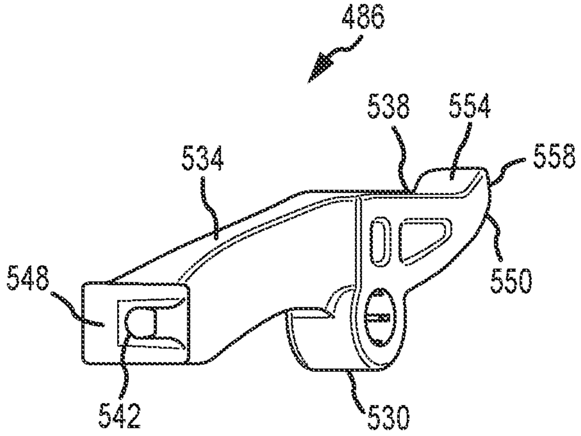
Figure 18E:
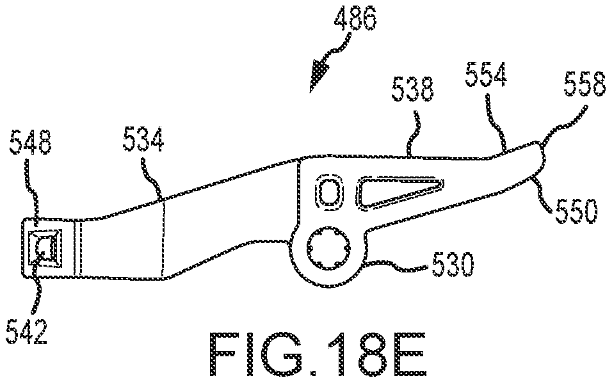

Referring back to FIGS. 18A through 18E, the shift arm 486 also may include first and second lever portions or arms 534, 538 extending away from the pin housing 530 in different directions, which may be opposing. The first lever arm 534 may include an eyelet 542 configured to accommodate the passage of the operating element 46. The eyelet 542 may be closed, as shown in FIG. 18D, or open. As shown in FIGS. 20A and 20B, when the shift arm 486 is coupled to the base 74, the eyelet 542 may be approximately vertically aligned with the operating element conduit 162 extending through inner and outer annular rims 142, 146 of the base 74 so that a vertical movement of the operating element 46 (see FIGS. 1B through 1D) may not pivot or rotate the shift arm 486 about the cross pin 190 but a lateral movement of the operating element 46 transverse to the rotation axis of the shift arm 486 (see FIG. 1E) may pivot or rotate the shift arm 486 about the cross pin 190. As shown in FIG. 18C, the first lever arm 534 also may include a guide or pathway 546 to facilitate threading of the operating element 46 through the eyelet 542. The eyelet 542 may open through an angled bottom surface 548 of the shift arm 486.

Figure 16A:
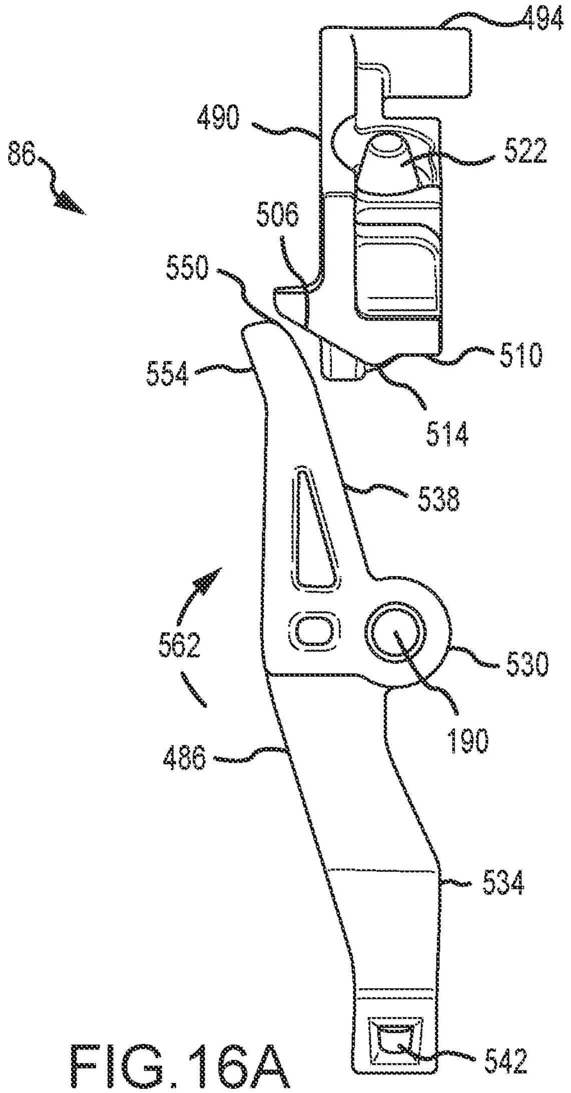
FIGS. 16A and 16B are side elevation views of the actuator assembly shown in FIGS. 4A and 4B in a retraction mode and an extension mode, respectively.
Figure 16B:
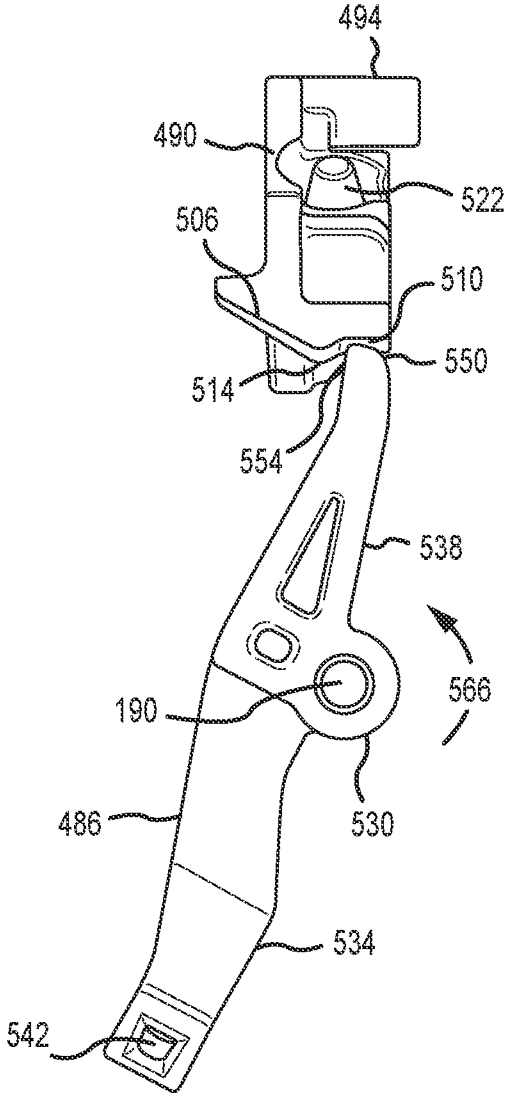
Figure 17A:
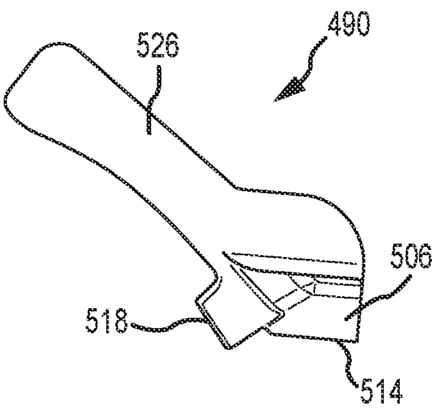
FIGS. 17A through 17F are a distal elevation view, a proximal elevation view, a side elevation view, another side elevation view, yet another side elevation view, and a further side elevation view, respectively, of the lock arm shown in FIGS. 16A and 16B.
Figure 17B:
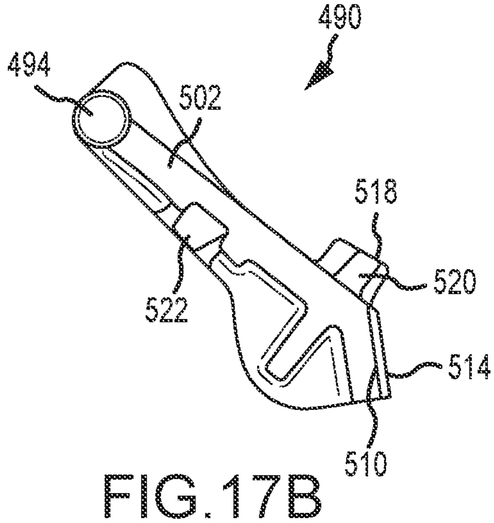
Figure 17C:
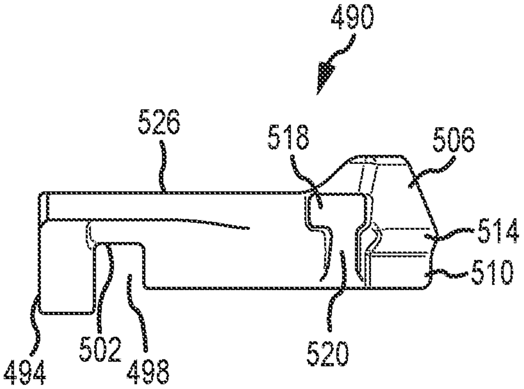
Figure 17D:
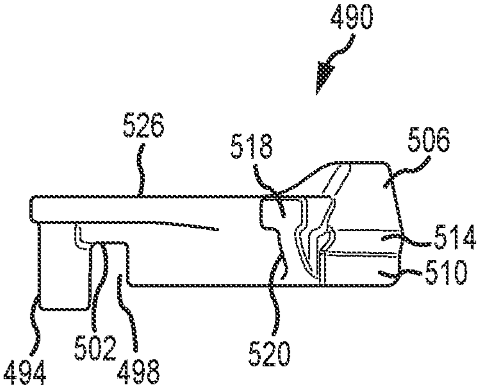
Figure 17E:
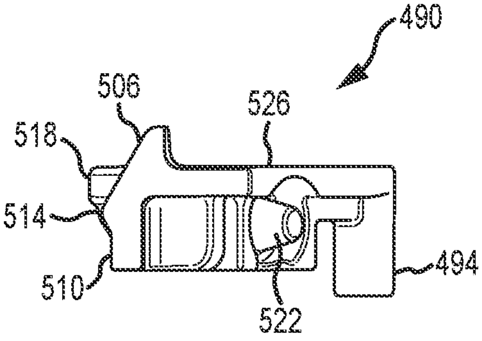
Figure 17F:
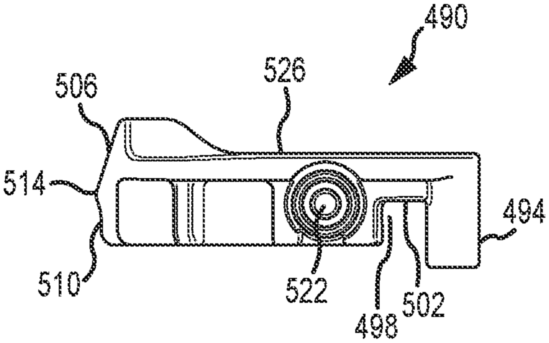

With continued reference to FIGS. 18A through 18E, the second lever arm 538 may include a biasing face or surface 550 located on a proximal side of the arm 538 and a retaining shoulder 554 located on a distal side of the arm 538, both of which may be associated with a terminal end 558 of the second lever arm 538. The biasing face 550 may be rounded to facilitate smooth engagement with, and thus shifting of, the lock arm 490. With reference to FIGS. 16A and 16B, upon rotation of the shift arm 486 in a first direction, as indicated by arrow 562, the biasing face 550 contacts the biasing surface 506 of the lock arm 490 to pivot the lock arm 490 about the post 494, thereby disengaging the engagement tooth 518 from the outer teeth 474 of the ring gear 294 to permit extension of the shade 22. Once the biasing face 550 surpasses the detent 514, the retaining shoulder 554 engages the detent 514 and retains the lock arm 490 in the shade extension mode until a lateral force is exerted on the first lever arm 534. The lateral force may be created by an operating element 46 extending through the eyelet 542, which may pivot or rotate the shift arm 486 in a second direction, as indicated by arrow 566, to overcome the detent 514 and release the lock arm 490 from the extension mode. As previously discussed, the lock arm 490 may be biased toward the engaged position or shade retraction mode and thus, once the lock arm 490 is released from engagement with the shift arm 486, the lock arm 490 may automatically pivot into engagement with the external teeth 474 of the ring gear 294.

Figure 24A:
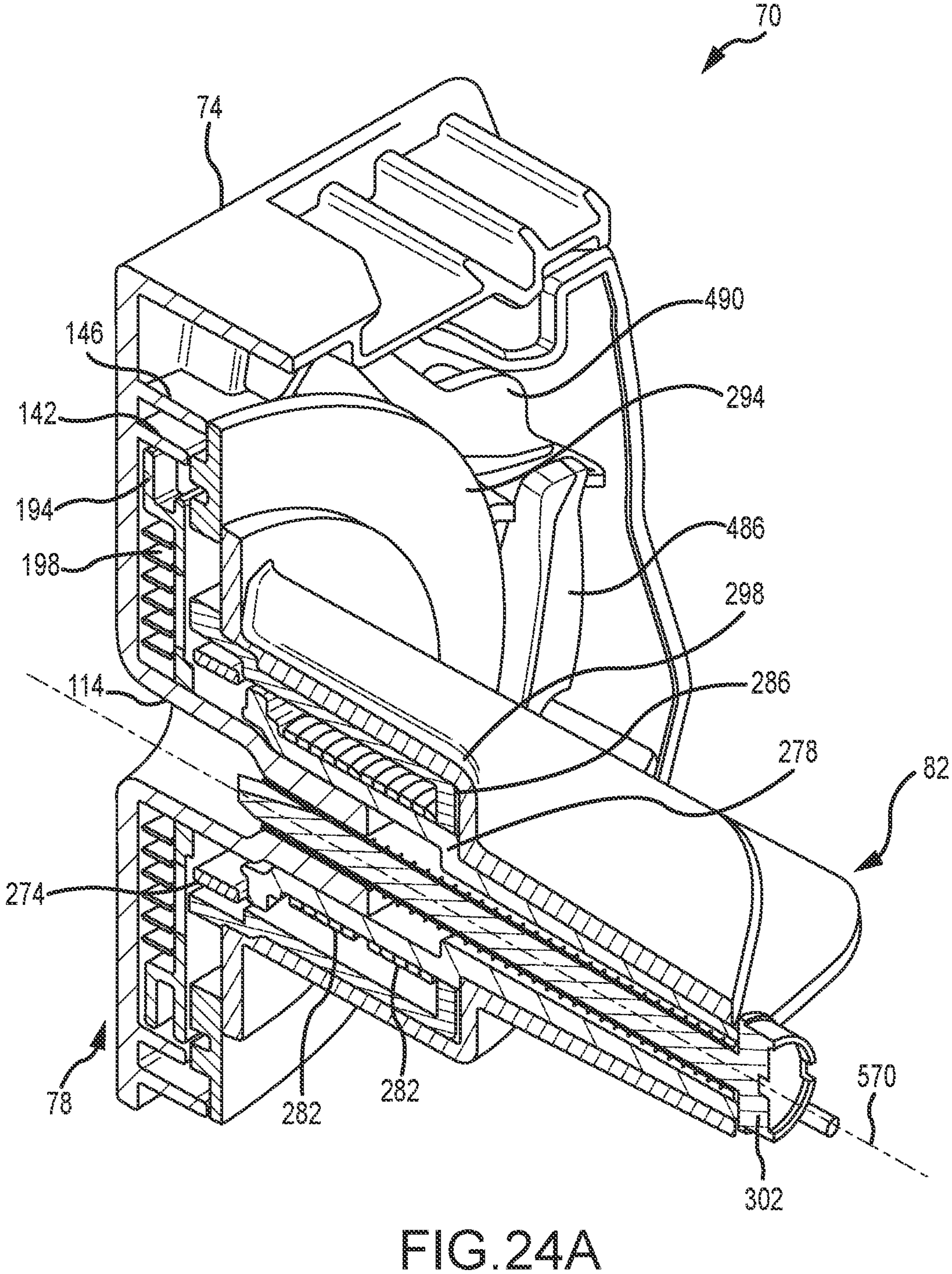
FIGS. 24A and 24B are cross-sectional views of the operating system of FIGS. 3A through 4B taken along the line 24A,B-24A,B as shown in FIG. 3B.
Figure 24B:
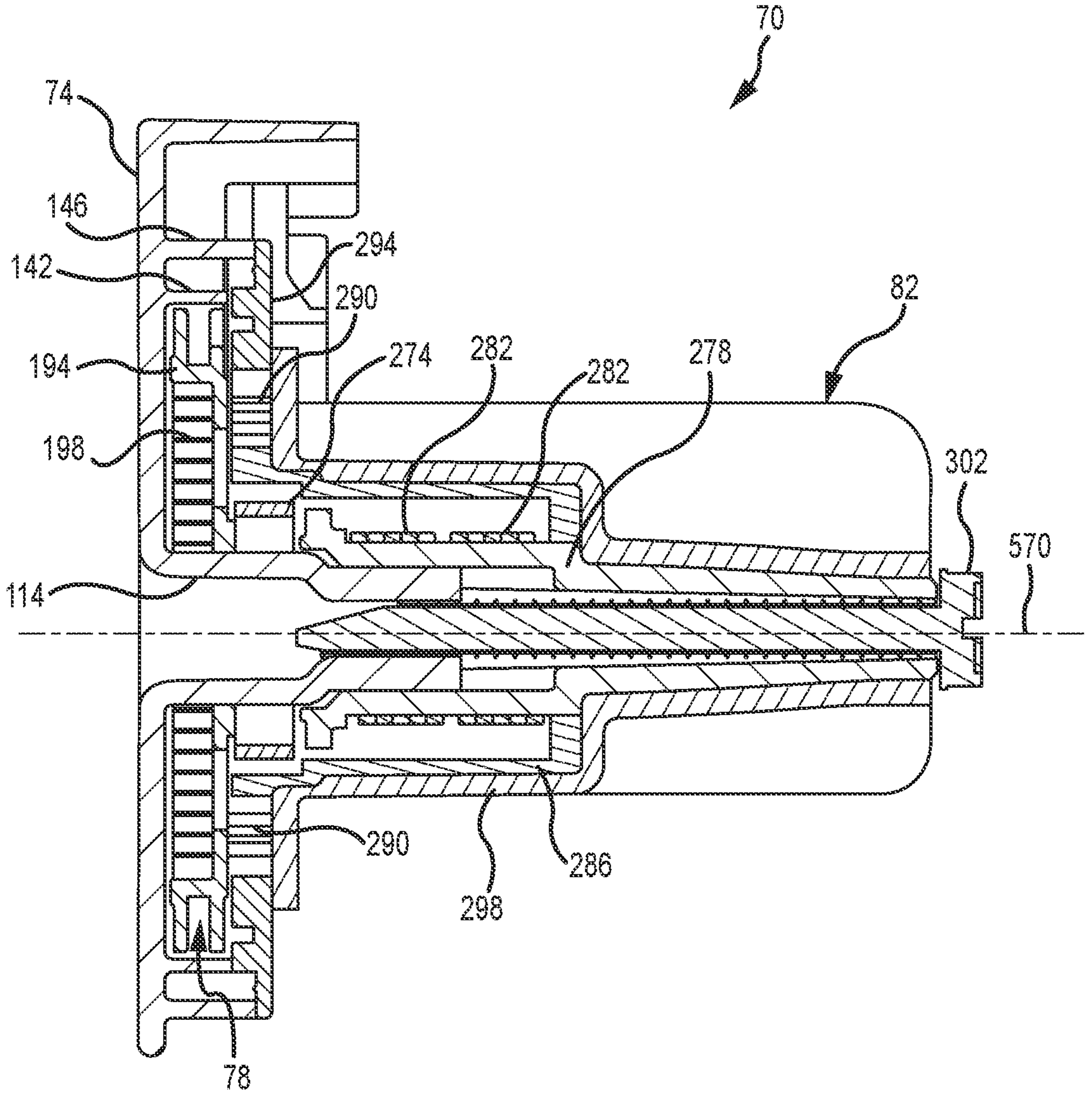

Referring now to FIGS. 24A and 24B, one example of the assembled operating system 70 is depicted in cross section. The operating system 70 may be a self-contained, modular unit that is insertable into an end of the roller 42 and may serve as an end cap 26 of the head rail 14. In one implementation, the operating system 70 provides a thin gap between an end of the roller 42 and an associated end of the head rail 14, thereby minimizing a light gap between the shade 22 and the architectural opening when the shade 22 is in an extended position across the opening. In one specific implementation, the distance between the end of the roller 42 and the end of the head rail 14 is about 0.44 inches.

With continued reference to FIGS. 24A and 24B, a fastener 302 may secure the operating system 70 together. The fastener 302 may extend along a central longitudinal axis 570 of the drive mechanism 78 and the transmission 82. As shown in FIGS. 24A and 24B, the fastener 302 may threadably engage the internal wall of the post 114 of the base 74. Additionally or alternatively, a nut, such as a lock nut, may threadably engage the fastener and may be housed within the hollow post 114 of the base 74 of the operating system 70.

In operation, the operating system 70 may be selectively switched into a retraction mode or an extension mode by manipulating the position of the actuator mechanism 86. In one implementation, a user may use the operating element 46 to switch the operating system 70 from a retraction mode into an extension mode. With reference to FIG. 21A, the lock arm 490 is engaged with the ring gear 294 (retraction mode). To disengage the lock arm 490 from the ring gear 294, and thus change the rotation direction of the roller 42, a user may pull the operating element 46 in a direction generally along a longitudinal axis of the roller 42 from a point proximate to an associated end of the roller 42 toward an opposing end of the roller 42. This transverse movement of the operating element 46 pivots or rotates the shift arm 486 about the pivot pin 190 in a first direction 562, moving the first or lower lever arm 534 axially away from the base 74 and the second or upper lever arm 538 axially toward the base 74 (see FIGS. 16A, 16B, 20A, 20B, and 21A). During the rotation of the shift arm 486 in the first direction 562 (see FIG. 16A), a face 550 of the second lever arm 538 contacts a surface 506 of the lock arm 490, thereby pivoting the lock arm 490 radially away from the ring gear 294 to disengage the tooth 518 of the lock arm 490 from the outwardly directed teeth 474 of the ring gear 294.

Figure 21D:
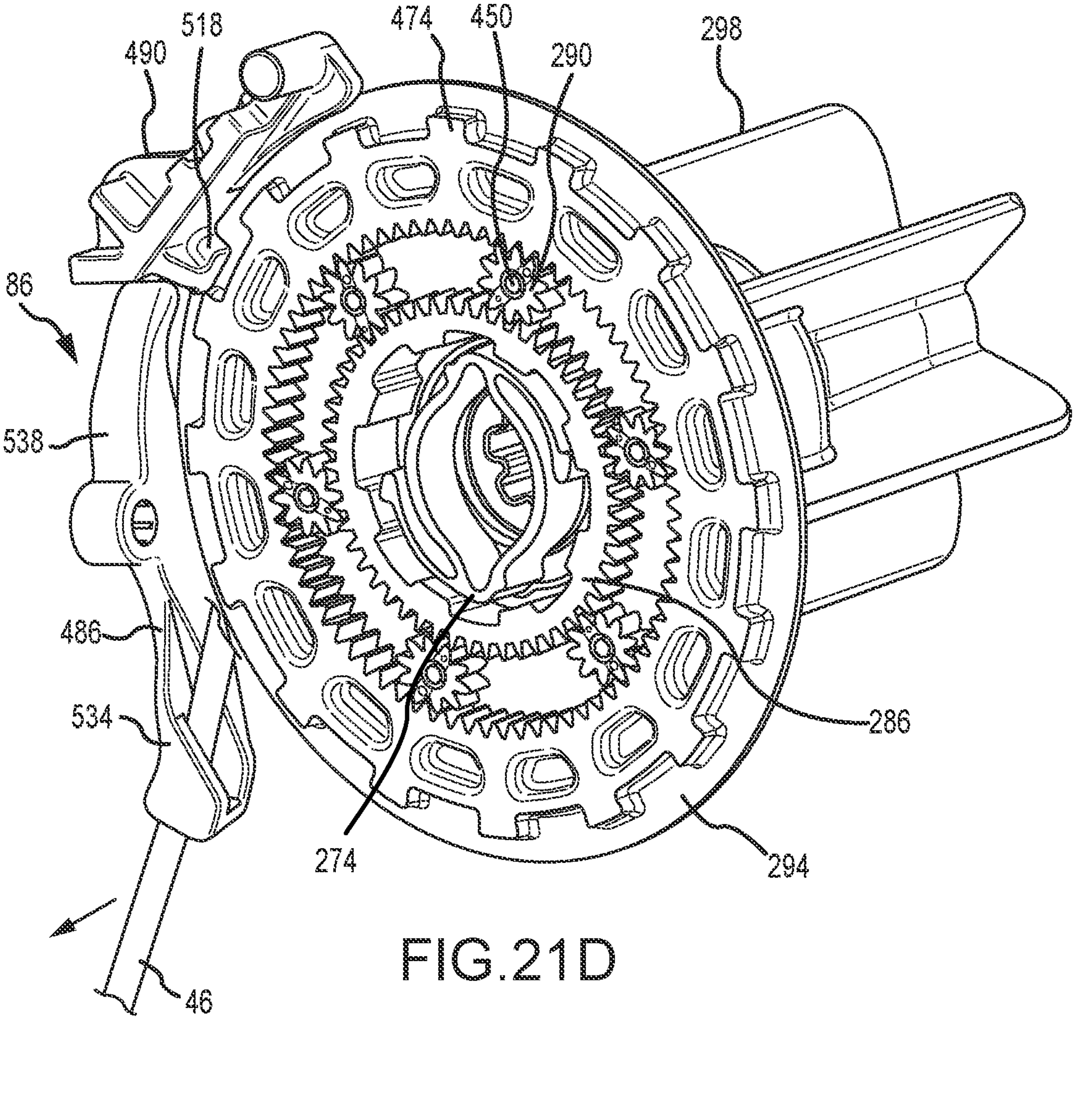
FIG. 21D is a proximal isometric view of the transmission and the actuator assembly of the operating system shown in FIGS. 4A and 4B positioned in an extension mode.

In one implementation, a user may use the operating element 46 to switch the operating system 70 from an extension mode into a retraction mode. With reference to FIG. 21D, the lock arm 490 is disengaged from the ring gear 294 (extension mode). To engage the lock arm 490 with the ring gear 294, and thus alter the rotation direction of the roller 42, a user may pull the operating element 46 in a vertically downward direction. Since the operating element 46 is routed downward from the operating element conduit 162 of the base 74 through the eyelet 542 of the shift arm 486 (see FIGS. 20A and 20B), upon a vertically downward movement of the operating element 46, the slight axial offset of the eyelet 542 relative to the conduit 162 causes the operating element 46 to move the first or lower lever arm 534 toward the base 74, which in turn moves the second or upper lever arm 538 away from the base 74, which in turn pivots the lock arm 490 radially towards the ring gear 294 into an engaged position (retraction mode). More particularly, the downward movement of the operating element 46 pivots or rotates the shift arm 486 about the pivot pin 190 in a second direction 566, moving the first or lower lever arm 534 axially toward the base 74 and the second or upper lever arm 538 axially away from the base 74 (see FIGS. 16A, 16B, 20A, 20B, and 21A). During rotation of the shift arm 486 in the second direction 566 (see FIG. 16B), a retaining shoulder 554 and a face 550 of the second lever arm 538 passes by a detent 514 of the lock arm 490, thereby permitting the lock arm 490 to pivot radially toward the ring gear 294 under the influence of the compression spring 524 (see FIG. 20C), resulting in the tooth 518 of the lock arm 490 meshing with the outwardly directed teeth 474 of the ring gear 294 (retraction mode, see FIG. 21A).

When the lock arm 490 is engaged with ring gear 294 (retraction mode), the operating system 70 permits the shade 22 to be raised or retracted. To raise or retract the shade 22, an operator may pull downward on the operating element 46. While pulling in a downward direction, the movement of the operating element 46 rotates the spool 194, which in turn increasingly tensions the spool spring 198. In addition, the clutch element 274 engages the sun gear 286, causing the sun gear 286 to rotate along with the spool 194. As the sun gear 286 rotates, the ring gear 294 is prevented from rotating by the engagement of the lock arm 490 with the outwardly directed teeth 474 of the ring gear 294. The locked ring gear 294 causes the planet gears 290 to orbit around the sun gear 286, which in turn causes the planet carrier 298 to rotate. As the planet carrier 298 is coupled to the roller 42, rotation of the planet carrier 298 rotates the roller 42, retracting the shade material 22.

At the end of the downward stroke, the operator releases or resistively raises the operating element 46 and the spool spring 198 correspondingly reels in the operating element 46 around the groove 218 of the spool 194. As the operating element 46 is retracted, the clutch element isolates the sun gear 286 from the rotation of the spool 194. Additionally, the operating system 70 prevents the roller 42 from rotating in a shade extension direction, thereby maintaining the position of the shade 22 relative to the architectural opening during the intermittent retraction of the operating element 46. In one implementation, the sun gear 286 is rotationally locked to the stationary axle 278 in the shade extension direction by at least one wrap spring 282 and the ring gear 294 is rotationally locked by the actuator mechanism 86. Thus, in this implementation, the sun gear 286 and the ring gear 294 prevent the planet gears 298 from orbiting about the sun gear 286, thereby prohibiting extension of the shade material 22 across the opening when the operating system 70 is in a retraction mode. Therefore, even though the spool 194 is able to rotate and reel in the operating element 46, the operating system 70 holds the shade 22 in place. In this fashion, the operator can cyclically pull down on and then retract the cord as many times as necessary to raise or retract the shade material 22 a desired distance, causing the spool 194 to reciprocate rotationally back and forth and the sun gear 286 to incrementally advance forward in a winding direction.

To switch the operating system 70 into an extension mode to extend or lower the shade 22, the operator may move the operating element 46 in a lateral direction resulting in a diagonal extension of the operating element 46. This lateral movement may be toward the middle of the shade 22. The lateral movement of the operating element 46 causes the shift arm 486 to pivot or rotate, with the first or lower lever arm 534 moving away from the base 74 and the second or upper lever arm 538 moving toward the base 74, which as previously discussed may be an end cap. The biasing face 550 of the shift arm 486 contacts the biasing surface 506 of the lock arm 490, which in turn causes the lock arm 490 to pivot away from and disengage the ring gear 294. During this operation, the operator may feel and/or hear a click as the ring gear 294 is released, which may correspond to the biasing face 550 and/or the terminal end 558 of the shift arm 486 surpassing a detent 514 on the lock arm 490. The amount of operating element 46 motion needed to switch modes of the operating system 70 may be negligible.

Once the lock arm 490 is disengaged from the ring gear 294, the fixed orientation of the roller 42 may be released, allowing the shade material 22 to unwind and lower by gravity or any other downward biasing element (such as a supplemental spring), for example. The detent 514 associated with the interface of the shift arm 486 and the lock arm 490 maintains the actuator mechanism 86 in the shade extension mode, allowing the operator to release the operating element 46 and no longer monitor the covering 10 as the shade 22 is lowering. Generally, the shade 22 will lower regardless of the operating element 46 handling nuances of the operator, such as holding or releasing the operating element 46. To stop the extension or lowering of the shade 22, the operator may shift the operating system 70 into a retraction mode by pulling vertically downward on the operating element 46, for example. With reference to FIG. 16B, the downward motion of the operating element 46 pivots or rotates the shift arm 486 about the cross pin 190 in the second direction 566, as the operating element 46 is routed through the operating element conduit 162, which resides in the same general vertical plane as the pivot pin 190 (see FIG. 4A). The roller 42 or operating system 70 may include any suitable speed governing device to regulate the downward speed of the shade 22.

Figure 25:
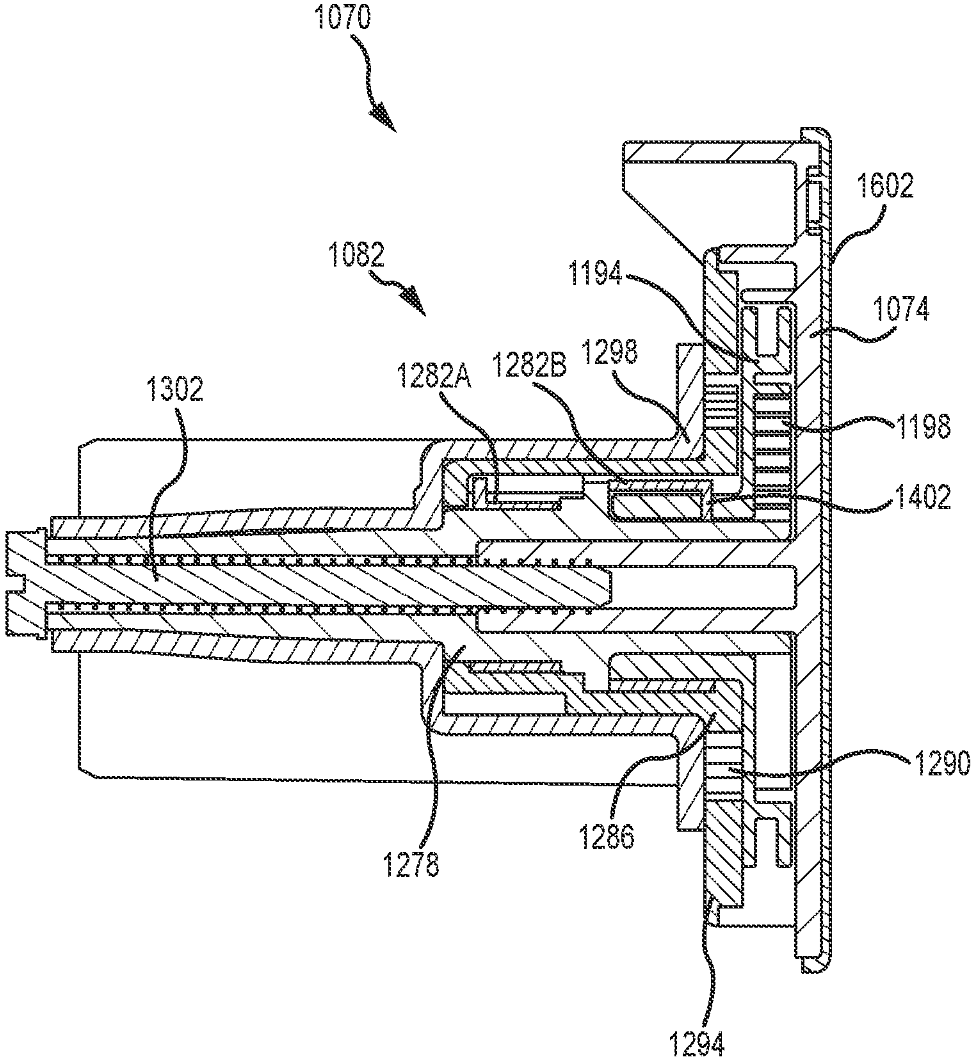
FIG. 25 is a section view of another example of an operating system.
Figure 26A:
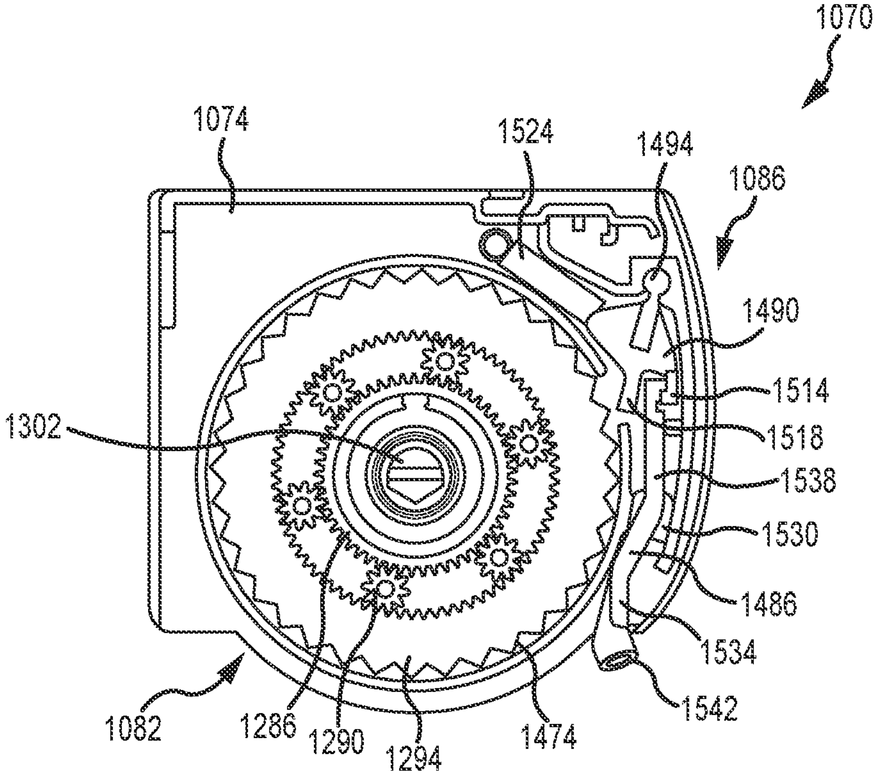
FIGS. 26A and 26B are distal elevation views of the operating system of FIG. 25 in an extension and a retraction mode, respectively.
Figure 26B:
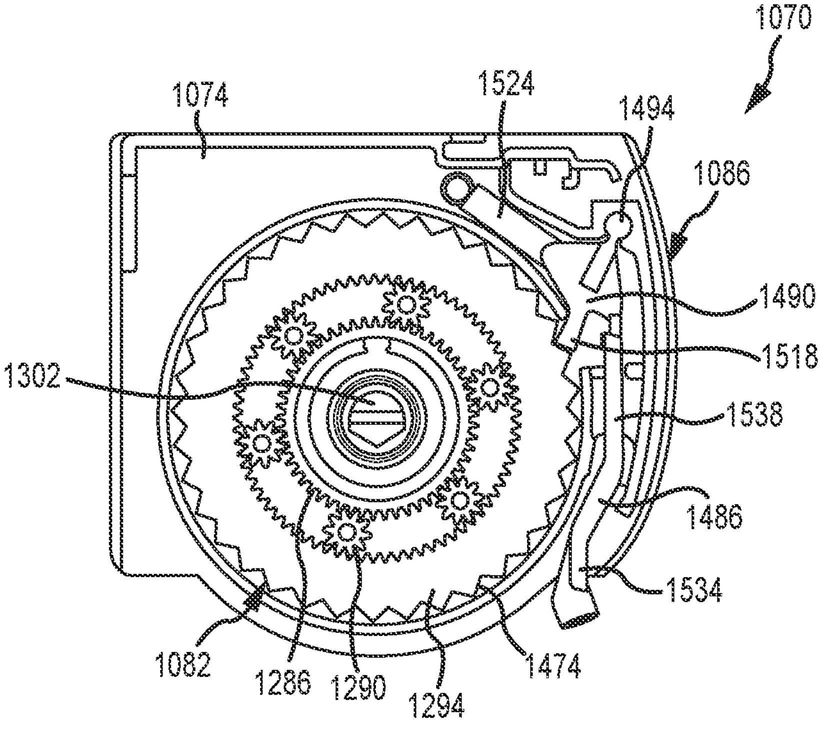

With reference to FIGS. 25, 26A, and 26B, another example of an operating system 1070 is provided. The operating system 1070 generally has the same features and operation as the operating system 70 previously described with the exception of the clutch element 274 and the actuator mechanism 86. Accordingly, the preceding discussion of the features and operation of the operating system 70, as depicted in FIGS. 1-24, should be considered equally applicable to the operating system 1070 depicted in FIGS. 25, 26A, and 26B, except as noted in the following discussion pertaining to the wrap springs 1282 and the actuator mechanism 1086. The reference numerals used in FIGS. 25, 26A, and 26B correspond to the reference numbers used in FIGS. 1-24 to reflect the similar parts and components, except the reference numerals have been incremented by one-thousand.

As shown in FIGS. 25 through 26B, the operating system 1070 may include a transmission 1082 having a sun gear 1286, a plurality of planet gears 1290, and an annulus or ring gear 1294. Similar to the operating system 70 previously discussed, the operating system 1070 includes a wrap spring 1282A coupled to the sun gear 1286 and having an interference fit between the inner diameter of the wrap spring 1282A and the outer diameter of the stationary axle 1278. The wrap spring 1282A rotationally slips around the axle 1278 in one direction to permit retraction of the shade, but locks around the axle 1278 in the other direction to prevent unwarranted extension of the shade. In contrast to the operating system 70, the operating system 1070 replaces the clutch element 274 with a second wrap spring 1282B having an interference fit between the outer diameter of the wrap spring 1282B and the inner diameter of the sun gear 1286.

The second wrap spring 1282B includes a tang 1402 that is coupled to the spool 1194 so that rotation of the spool 1194 in a first, shade retraction direction is transmitted to the sun gear 1286 and rotation of the spool 1194 in a second, shade extension direction is not transmitted to the sun gear 1286. Thus, similar to the operating system 70 previously discussed, the operating system 1070 selectively transfers torque from the drive mechanism to the transmission in a first direction that retracts the shade but not in a second direction that extends the shade. Further, the operating system 1070 includes a brake element that maintains the shade in a desired position until an operator shifts the operating system 1070 into an extension mode. As shown in FIG. 25, the operating system 1070 may include an optional cover 1602, which may be snap-fit onto a proximal side of the base 1074.

With reference to FIGS. 26A and 26B, the operating system 1070 also includes an actuator or shift mechanism 1086. As shown in FIG. 26A, the actuator mechanism 1086 is in an extension mode in which the shift arm 1486 has pivoted the lock arm 1490 out of engagement with the outer teeth 1474 of the ring gear 1294, thereby permitting the shade to extend across an associated architectural opening. A detent 1514 located on the lock arm 1490 holds the shift arm 1486 in the extension mode until a lateral force is applied to the shift arm 1486 through the eyelet, for example. As shown in FIG. 26B, the actuator mechanism 1086 is in a retraction mode in which an engagement tooth 1518 of the lock arm 1490 is engaged with the external teeth 1474 of the ring gear 1294, thereby preventing rotation of the ring gear 1294 relative to the base 1074 and preventing extension of the shade. Similar to the actuator mechanism 86 previously discussed, the lock arm 1490 is biased into the engaged position or retraction mode with a biasing element. However, the actuator mechanism 1086 employs an extension spring 1524, rather than the compression spring 524 discussed in relation to the actuator mechanism 86. As can be appreciated, any suitable type of biasing element may be used in either example operating system. Although the shape of the shift arm 1486 and the lock arm 1490 are different than the shift arm 486 and the lock arm 490 previously discussed, the shift arm 1486 and the lock arm 1490 generally include the same features and function similarly as the shift arm 486 and the lock arm 490.

The foregoing description has broad application. For example, while the provided examples include a transmission having a planetary gear set, it should be appreciated that the concepts disclosed herein may equally apply to any type of transmission, regardless of whether the transmission includes a gear reduction. For instance, some transmissions used by the operating system may not include a planetary gear set, such as in applications for small sized window coverings. Thus, it should be appreciated that the actuator mechanism may engage any type of transmission device. Further, the input and output components of the planetary gear set may vary depending on the window covering application. Moreover, although wrap springs and one type of clutch element have been discussed, other suitable brake and/or clutch elements may be used. Additionally, the example operating system may be used with any type of shade, including, but not limited to, roller and stackable shades. Furthermore, the example operating module or system may be used in association with either end of a head rail. For example, although the illustrated operating module may be configured for association with a right-hand side of a covering, an operating module configured for association with a left-hand side of the covering may be provided and may be a mirror image of the illustrated module. Accordingly, the discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

I claim:

1. An operating system for use with a covering, the covering including a roller and a shade, the shade being movable between an extension direction and a retraction direction, the operating system being operably associated with the roller, the operating system comprising:

an operating element arranged and configured to provide an input torque for selectively rotating the roller to move the shade in the retraction direction;

a transmission arranged and configured to selectively transmit the input torque to the roller; and an actuator mechanism operatively associated with the operating element and the transmission, the actuator mechanism being pivotably moveable between a first position and a second position;

wherein:

the operating system includes a retraction mode and an extension mode, in the retraction mode, the operating system is operable to raise the shade in the retraction direction, and in the extension mode, the operating system is operable to lower the shade in the extension direction;

movement of the actuator mechanism between the first and second positions switches the operating system between the retraction and extension modes, respectively; and in the extension mode, the operating system is arranged and configured to enable the shade to move in the extension direction automatically under an influence of gravity without further action by an operator;

wherein the actuator mechanism includes a first arm and a second arm, the second arm being configured to slidably contact the first arm to move the first arm, the first arm selectively engages with the transmission to set a rotation direction of the roller, the second arm operably associated with the first arm to move the first arm into and out of engagement with the transmission; and wherein the second arm is movable about a first axis that is generally transverse to a longitudinal axis of the roller, and the first arm is movable about a second axis that is generally transverse to the first axis.

2. The operating system of claim 1, wherein movement of the operating element in a predetermined direction moves the actuator mechanism between the first and second positions.

3. The operating system of claim 2, wherein a downward motion of the operating element shifts the actuator mechanism to the first position.

4. The operating system of claim 3, wherein a lateral motion of the operating element shifts the actuator mechanism to the second position.

5. The operating system of claim 1, wherein in the retraction mode, the operating element is moveable by an operator in a series of reciprocating strokes to raise the shade in the retraction direction.

6. The operating system of claim 5, further comprising a brake mechanism, wherein, in the retraction mode, the brake mechanism is arranged and configured to prevent the shade from lowering in the extension direction.

7. The operating system of claim 1, wherein moving the second arm causes the first arm to disengage from the transmission.

8. A covering for an architectural opening, comprising:

a rotatable roller rotatable about a longitudinal axis in an extension direction and a retraction direction;

a shade associated with the roller; and an operating system operably associated with the roller, the operating system comprising;

a base;

a drive mechanism associated with the base to provide an input torque;

a transmission associated with the drive mechanism to selectively transmit the input torque to the roller;

an engagement arm operably associated with the base; and an actuator arm operably associated with the base, the actuator arm arranged and configured to set a rotation direction of the roller, the actuator arm movable about a first axis generally transverse to the longitudinal axis of the roller;

wherein the engagement arm is movable about a second axis and selectively engages the transmission to set the rotation direction of the roller.

9. The covering of claim 8, wherein the second axis is one or both of generally parallel to the longitudinal axis of the roller, and generally transverse to the first axis.

10. The covering of claim 8, wherein the transmission includes a ring gear, and wherein the engagement arm selectively engages the ring gear to set the rotation direction of the roller.

11. The covering of claim 8, wherein the operating system further comprises a biasing element configured to bias the engagement arm into engagement with the transmission.

12. The covering of claim 8, wherein to set the rotation direction of the roller to the extension direction, the actuator arm contacts the engagement arm to disengage the engagement arm from the transmission, wherein the engagement arm includes a detent configured to retain the actuator arm in a position associated with the extension direction.

13. The covering of claim 8, wherein when the engagement arm sets the rotation direction of the roller to an extension direction, the shade extends without further action by an operator.

14. The covering of claim 8, wherein the drive mechanism includes a single operating element, the single operating element operably associated with the actuator arm so that select movement of the single operating element moves the actuator arm.

15. The covering of claim 8, wherein when the actuator arm sets the rotation direction of the roller to the extension direction, the shade extends automatically under the influence of gravity without further action by an operator.

16. The covering of claim 8, wherein the actuator arm is positioned relative to the transmission so that the actuator arm does not engage the transmission.

* * * * *